(12) United States Patent
Asakura et al.

(10) Patent No.: US 8,066,390 B2
(45) Date of Patent: Nov. 29, 2011

(54) ANTIGLARE FILM, ANTIREFLECTION FILM, POLARIZING PLATE AND IMAGE DISPLAY DEVICE

(75) Inventors: Tetsuya Asakura, Kanagawa (JP); Tokuju Oikawa, Kanagawa (JP); Ryuji Saneto, Kanagawa (JP)

(73) Assignee: Fujifilm Corporation, Tokyo (JP)

( * ) Notice: Subject to any disclaimer, the term of this patent is extended or adjusted under 35 U.S.C. 154(b) by 302 days.

(21) Appl. No.: 12/427,464

(22) Filed: Apr. 21, 2009

(65) Prior Publication Data
US 2009/0262431 A1    Oct. 22, 2009

(30) Foreign Application Priority Data
Apr. 22, 2008   (JP) ................ P2008-111590

(51) Int. Cl.
*G02B 27/00* (2006.01)
(52) U.S. Cl. ........................................ 359/601
(58) Field of Classification Search .......... None
See application file for complete search history.

(56) References Cited

U.S. PATENT DOCUMENTS

| | | | |
|---|---|---|---|
| 7,857,468 B2 * | 12/2010 | Chen et al. ............ | 359/601 |
| 2004/0070041 A1 | 4/2004 | Obayashi et al. | |
| 2007/0020406 A1 * | 1/2007 | Hattori .................. | 428/1.6 |
| 2007/0121211 A1 * | 5/2007 | Watanabe et al. ....... | 359/601 |
| 2007/0236631 A1 * | 10/2007 | Ohtani et al. .......... | 349/96 |

FOREIGN PATENT DOCUMENTS
JP     2004-170901 A    6/2004
* cited by examiner

*Primary Examiner* — Derek S Chapel
(74) *Attorney, Agent, or Firm* — Birch, Stewart, Kolasch & Birch, LLP

(57) ABSTRACT

An antiglare film includes: a transparent support; and an antiglare layer containing a light-transmitting particle and a light-transmitting resin, wherein the light-transmitting particle has a structure including a core particle and a shell layer, each of the core particle and the shell layer contains an organic polymer, the shell layer has a thickness of from 10 to 2,000 nm, the core particle has a refractive index of from 1.54 to 1.65, and the shell layer has a refractive index of from 1.46 to 1.53.

13 Claims, 3 Drawing Sheets

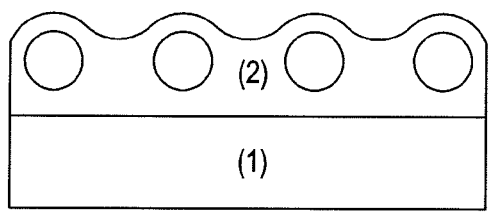
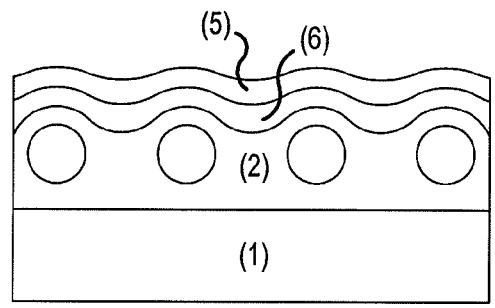
FIG.5  FIG.6
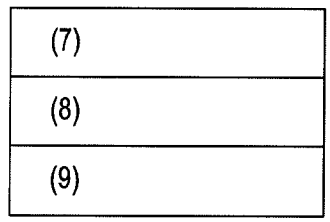
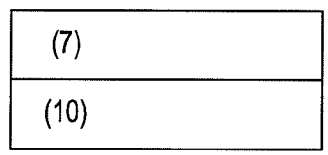
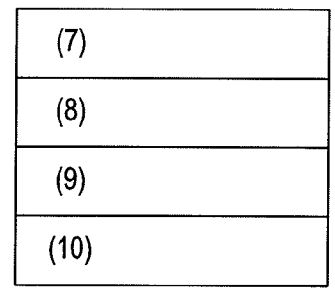
FIG.7  FIG.8  FIG.9
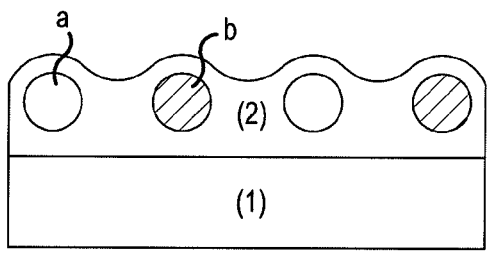
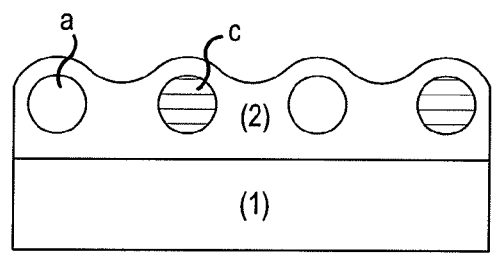
FIG.10  FIG.11
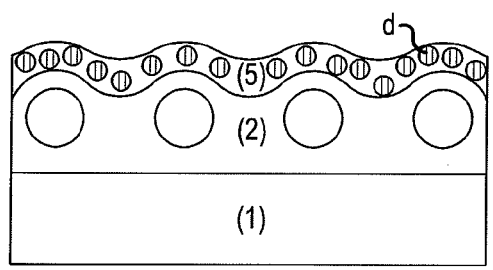
FIG.12

ANTIGLARE FILM, ANTIREFLECTION FILM, POLARIZING PLATE AND IMAGE DISPLAY DEVICE

FIELD OF THE INVENTION

The present invention relates to an antiglare film, an antireflection film, a polarizing plate and an image display device.

BACKGROUND OF THE INVENTION

In various image display devices such as liquid crystal display device (LCD), plasma display panel (PDP), electroluminescent display (ELD) and cathode ray tube display device (CRT), an antiglare film or an antiglare antireflection film is used on the display surface to prevent reduction in the contrast due to reflection of outside light or disturbing reflection of an image. With widespread usage in an office or household environment, it is required to enhance the antiglare property of preventing a fluorescent lamp in room or the viewer's figure from causing disturbing reflection on the display surface and more improve the display contract in a bright place (see, for example, JP-A-2004-170901 (the term "JP-A" as used herein means an "unexamined published Japanese patent application") (corresponding to US2004/0070041 A1)).

SUMMARY OF THE INVENTION

In an antiglare film having an antiglare layer containing at least one kind of a light-transmitting particle and at least one kind of a light-transmitting resin, a technique of adding a light-transmitting particle to the antiglare layer is used so as to obtain an antiglare function of causing light scattering by forming unevenness on the antiglare layer surface (surface scattering property) and a light scattering function owing to difference in the refractive index between the light-transmitting particle and the light-transmitting resin in the antiglare layer (internal scattering property). Excessively large internal scattering has an adverse effect of decreasing the display contrast, whereas excessively small internal scattering brings about a problem that glare is intensified due to the lens effect of the surface unevenness. Thus, appropriate internal scattering is demanded. For imparting appropriate internal scattering, a refractive index difference needs to be present between the light-transmitting particle and the light-transmitting resin.

However, when there is a refractive index difference between the light-transmitting particle and the light-transmitting resin, this gives rise to a problem that in the test of endurance (particularly heat resistance) of the antiglare layer, the internal scattering property greatly differs from that before the endurance test.

An object of the present invention is to provide an antiglare film excellent in the antiglare property, internal scattering property and endurance. Another object of the present invention is to provide an antireflection film, a polarizing plate and an image display device, each having the antiglare film.

As a result of intensive studies, the present inventors have found that when the refractive index of the core particle of an organic polymer-containing light-transmitting particle having a core particle/shell layer structure and the refractive index and film thickness of the shell layer are set to specific values, an antiglare film excellent in the antiglare property, internal scattering property and endurance (particularly heat resistance) can be produced. The present invention has been accomplished based on this finding.

In particular, it has been found that when the antiglare film of the present invention is used on the surface of a liquid crystal display device (LCD), excellent antiglare property and very scarce generation of glaring are achieved and even in a long-term use, reduction in the display contrast hardly occurs due to the surface film.

Also, according to the studies by the present inventors, the change of internal scattering in the endurance test is considered to be caused by deterioration in the adherence of the light-transmitting particle to the light-transmitting resin. That is, due to deterioration in the adherence of the light-transmitting particle to the light-transmitting resin, the light-transmitting particle and the light-transmitting resin are separated at their interface to produce a void in the antiglare layer, and this is considered to bring about a change of the internal scattering property.

The cause of separation between the light-transmitting particle and the light-transmitting resin at their interface is not clearly known, but the present inventors presume as follows. The light-transmitting resin is formed by curing under ionizing radiation or the like and has a property of being shrunk during curing and since curing further proceeds at the endurance test, the resin is considered to be shrunk. Furthermore, in the case where the refractive index difference between the light-transmitting particle and the light-transmitting resin is large, the light-transmitting particle and the light-transmitting resin are separated at their interface during the endurance test because of low affinity and in turn low adherence therebetween, and this is considered to cause significant void generation. It has been found that when the affinity of the light-transmitting particle for the light-transmitting resin is raised, the adherence is increased to allow neither interfacial separation nor void generation and therefore, the change of internal scattering does not occur.

That is, the above-described objects are attained by the following constructions.

(1) An antiglare film comprising a transparent support and an antiglare layer containing at least one kind of a light-transmitting particle and at least one kind of a light-transmitting resin, wherein the light-transmitting particle is a particle having a core particle/shell layer structure, each of the core particle and the shell layer contains an organic polymer, the thickness of the shell layer is from 10 to 2,000 nm, the refractive index ($n_1$) of the core particle is from 1.54 to 1.65, and the refractive index ($n_2$) of the shell layer is from 1.46 to 1.53.

(2) The antiglare film as described in (1) above, wherein the thickness of the shell layer is from 10 to 90 nm.

(3) The antiglare film as described in (1) or (2) above, wherein the average particle diameter expressed on a volume basis of the light-transmitting particle is from 6 to 20 μm and at the same time, the film thickness of the antiglare layer is from 8 to 35 μm.

(4) The antiglare film as described in (1) or (2) above, wherein the average particle diameter expressed on a volume basis of the light-transmitting particle is from 0.5 to 6 μm.

(5) The antiglare film as described in any one of (1) to (4) above, wherein the light-transmitting particle is contained in an amount of 5 parts by mass to less than 45 parts by mass per 100 parts by mass of the light-transmitting resin.

(6) The antiglare film as described in any one of (1) to (5) above, wherein the antiglare layer is a layer formed from a polymer or copolymer composed of at least one member of the following (A1) and (A2) or a mixed polymer of the polymer and copolymer:

(A1): an alkyl acrylate containing an alkyl group having at least either one group of a hydroxyl group and an acryloyl group; and (A2): an alkyl methacrylate containing an alkyl group having at least either one group of a hydroxyl group and an acryloyl group.

(7) The antiglare film as described in any one of (1) to (5) above, wherein the antiglare layer is a layer formed from a polymer or copolymer composed of at least one member of the following (A1') and (A2') or a mixed polymer of the polymer and copolymer:

(A1'): an alkyl acrylate containing an alkyl group having a hydroxyl group; and (A2'): an alkyl methacrylate containing an alkyl group having a hydroxyl.

(8) The antiglare film as described in any one of (1) to (7) above, wherein the shell layer contains at least one polymerization product selected from a polymerization product of an acrylic acid ester, a polymerization product of a methacrylic acid ester, and a copolymerization product of an acrylic acid ester and a methacrylic acid ester.

(9) The antiglare film as described in any one of (1) to (8) above, which has a surface conditioning layer with a film thickness of 0.5 to 12 μm on the antiglare layer.

(10) The antiglare film as described in any one of (1) to (9) above, wherein the antiglare layer contains two or more kinds of the light-transmitting particles having a core particle/shell layer structure or contains a light-transmitting particle having a single refractive index in addition to the light-transmitting particle having a core particle/shell layer structure.

(11) The antiglare film as described in any one of (1) to (10) above, wherein the sum of image clarities measured by four kinds of optical combs defined in JIS K7105 is 300% or less.

(12) An antireflection film having a low refractive index layer on the antiglare layer of the antiglare film described in any one of (1) to (11), the low refractive index layer having a refractive index lower than that of the antiglare layer.

(13) The antireflection film as described in (12) above, wherein the low refractive index layer contains a hollow silica particle.

(14) A polarizing plate comprising a polarizing film and a protective film provided on both sides of the polarizing film, wherein at least one of the protective films is the antiglare film described in any one of (1) to (11) above or the antireflection film described in (12) or (13) above.

(15) An image display device having disposed on the image display surface thereof the antiglare film described in any one of (1) to (11) above, the antireflection film described in (12) or (13) above, or the polarizing plate described in (14) above.

According to the present invention, an antiglare film excellent in the antiglare property, internal scattering property and endurance can be provided. Also, according to the present invention, an antireflection film, a polarizing plate and an image display device, each having the antiglare film, can be provided.

BRIEF DESCRIPTION OF THE DRAWINGS

FIG. 5 is a schematic cross-sectional view schematically showing a layer constitution of an embodiment of the antiglare film of the present invention.

FIG. 6 is a schematic cross-sectional view schematically showing a layer constitution of an embodiment of the antireflection film of the present invention.

FIG. 7 is a schematic cross-sectional view schematically showing a layer constitution of an embodiment of the polarizing plate of the present invention.

FIG. 8 is a schematic cross-sectional view schematically showing a layer constitution of an embodiment of the image display device of the present invention.

FIG. 9 is a schematic cross-sectional view schematically showing a layer constitution of another embodiment of the image display device of the present invention.

FIG. 10 is a schematic cross-sectional view schematically showing a layer constitution of another embodiment of the antiglare film of the present invention.

FIG. 11 is a schematic cross-sectional view schematically showing a layer constitution of another embodiment of the antiglare film of the present invention.

FIG. 12 is a schematic cross-sectional view schematically showing a layer constitution of another embodiment of the antireflection film of the present invention.

Figure 1:
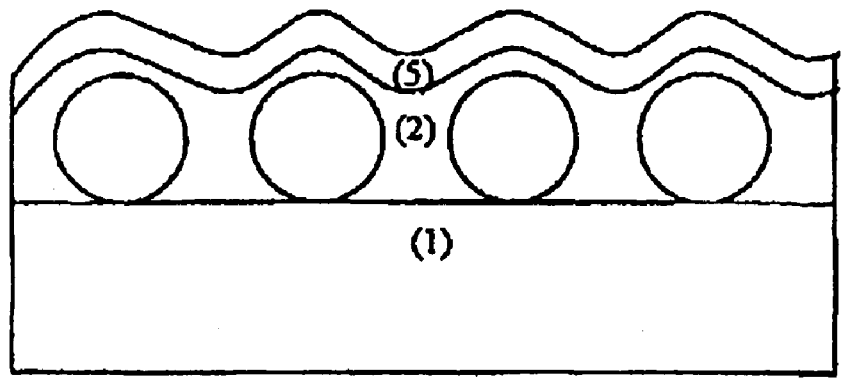
FIG. 1 is a schematic cross-sectional view schematically showing a preferred embodiment of the film of the present invention.

DESCRIPTION OF REFERENCE NUMERALS AND SIGNS (1) Support
(2) Antiglare layer
(3) Intermediate refractive index layer
(4) High refractive index layer
(5) Low refractive index layer
(6) Surface conditioning layer
(7) Antiglare film or antireflection film
(8) Polarizing film (PVA)
(9) Protective film
(10) Image display device
"a" Core/shell particle having a structure comprising a core particle and a shell layer
"b" Core/shell particle which is different from the particle "a"
"c" Particle having a single refractive index
"d" Hollow silica particle

DETAILED DESCRIPTION OF THE INVENTION

The present invention is described in detail below. Incidentally, the expression "from (numerical value 1) to (numerical value 2)" as used in the present invention for indicating a physical value, a characteristic value or the like means "(numerical value 1) or more and (numerical value 2) or less". Also, the term "(meth)acrylate" means "at least either acrylate or methacrylate". The same applies to "(meth)acrylic acid" and the like.

<Layer Construction of Antiglare Film>

The antiglare film of the present invention is an antiglare film comprising a transparent support and an antiglare layer containing at least one kind of a light-transmitting particle and at least one kind of a light-transmitting resin, wherein the light-transmitting particle has a core particle/shell layer structure, each of the core particle and the shell layer contains an organic polymer, the refractive index ($n_1$) of the core particle is higher than the refractive index ($n_2$) of the shell layer, and the thickness of the shell layer is from 10 to 2,000 nm.

The antiglare film of the present invention has at least one antiglare layer on a transparent support. The antiglare layer may be composed of one layer or a plurality of layers, for example, from 2 to 4 layers.

In the antiglare film of the present invention, a layer other than the antiglare layer may be provided by coating. Examples of such a layer include a hardcoat layer, an antistatic layer, a low refractive index layer, an antifouling layer and a surface conditioning layer.

Examples of the layer construction preferred as the antiglare film of the present invention or as an optical film containing the antiglare film are set forth below. In the following constructions, the substrate film indicates a support composed of a film.

Figure 2:
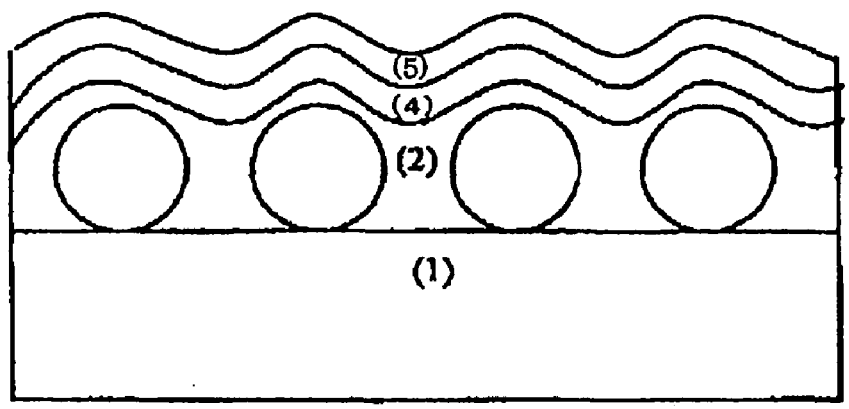
FIG. 2 is a schematic cross-sectional view schematically showing a preferred embodiment of the film of the present invention.
Figure 3:
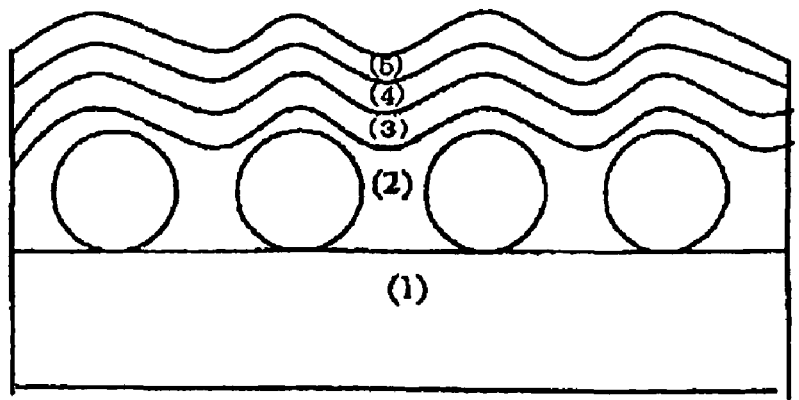
FIG. 3 is a schematic cross-sectional view schematically showing a preferred embodiment of the film of the present invention.

Substrate film/antiglare layer (FIG. 5)
Substrate film/antistatic layer/antiglare layer
Substrate film/antiglare layer/surface conditioning layer
Substrate film/antiglare layer/low refractive index layer (FIG. 1)
Substrate film/antiglare layer/surface conditioning layer/ low refractive index layer (FIG. 6)
Substrate film/antiglare layer/antistatic layer/low refractive index layer
Substrate film/hardcoat layer/antiglare layer/low refractive index layer
Substrate film/hardcoat layer/antiglare layer/antistatic layer/low refractive index layer
Substrate film/hardcoat layer/antistatic layer/antiglare layer/low refractive index layer
Substrate film/antiglare layer/high refractive index layer/ low refractive index layer (FIG. 2)
Substrate film/antiglare layer/intermediate refractive index layer/high refractive index layer/low refractive index layer (FIG. 3)
Antistatic layer/substrate film/antiglare layer/intermediate refractive index layer/high refractive index layer/low refractive index layer
Substrate film/antistatic layer/antiglare layer/intermediate refractive index layer/high refractive index layer/low refractive index layer
Antistatic layer/substrate film/antiglare layer/high refractive index layer/low refractive index layer/high refractive index layer/low refractive index layer The antiglare layer preferably has all the functions of a hardcoat layer, an antistatic layer, an antifouling layer and the like.

In the case where the antiglare film has an intermediate refractive index layer and a high refractive index layer, at least one of the intermediate refractive index layer and the high refractive index layer preferably also has a function as an antistatic layer. In the case of a three-layer construction of intermediate refractive index layer/high refractive index layer/low refractive index layer, from the standpoint of realizing the desired antistatic property and refractive index, the intermediate refractive index layer preferably also has a function as an antistatic layer.

The antiglare film of the present invention can be suitably used as an optical film by having these layers.

In the present invention, in view of low reflection, an antireflection film having a construction containing an intermediate refractive index layer/a high refractive index layer/a low refractive index layer is preferred, and examples thereof include the constructions described in JP-A-8-122504, JP-A-8-110401, JP-A-10-300902, JP-A-2002-243906 and JP-A-2000-111706. In terms of simple production and high productivity, preferred embodiments of the present invention are an antiglare film having a single-layer antiglare layer on a support and an antireflection film having a single-layer antiglare layer and a single-layer low refractive index layer in this order on a support.

<Construction of Antiglare Layer>

The antiglare layer of the present invention is preferably a layer formed by coating, drying and curing a coating solution containing an organic solvent, a matrix-forming component (e.g., monomers for binder) and an organic polymer light-transmitting particle having a core particle/shell layer structure where the refractive index ($n_1$) of the core particle is higher than the refractive index ($n_2$) of the shell layer and the thickness of the shell layer is from 10 to 2,000 nm.

The coating solution for forming the antiglare layer contains, for example, monomers for a main matrix-forming binder, which are raw materials of a light-transmitting polymer formed after curing by ionizing radiation or the like, the above-described light-transmitting particle having a specific particle diameter, and a polymerization initiator and preferably further contains a polymer compound for adjusting the viscosity of the coating solution, an inorganic microfiller for reducing curling or adjusting the refractive index or the like, and a coating aid.

The thickness of the antiglare layer is preferably from 3 to 40 μm and when the average particle diameter expressed on a volume basis of the light-transmitting particle is from 6 to 20 μm, the thickness is more preferably from 8 to 35 μm, still more preferably from 10 to 25 μm, and most preferably from 11 to 14 μm. In the case where the average particle diameter expressed on a volume basis of the light-transmitting particle is from 0.5 to 6 μm, the thickness is more preferably from 3 to 15 μm, still more preferably from 3 to 8 μm, and most preferably from 4 to 6 μm. By setting the thickness of the antiglare layer to the range of 3 to 40 μm, surface unevenness in a suitable range can be imparted. That is, when the thickness of the antiglare layer is 3 μm or more, good denseness of black can be ensured, and when the thickness of the antiglare layer is 40 μm, good antiglare property is obtained and the brittleness of film is lessened.

<Light-Transmitting Particle of Antiglare Layer>

The light-transmitting particle dispersed in the antiglare layer has a core particle/shell layer structure that is a double structure consisting of a core part (core) and a shell part (outer shell).

The average particle diameter expressed on a volume basis of the light-transmitting particle is preferably from 0.5 to 20 μm. The average particle diameter of the light-transmitting particle is preferably from 0.5 to 6 μm or from 6 to 20 μm, more preferably from 1 to 5 μm or from 7.5 to 15 μm, still more preferably from 1.5 to 4 μm or from 8.0 to 12 μm.

When the average particle diameter is 0.5 μm or more, the light scattering angle distribution can be prevented from spreading to a wide angle and generation of character blurring on the display can be suppressed. On the other hand, when the average particle diameter is 20 μm or less, the film thickness of a layer added can be made thin and generation of curling or rise of cost can be prevented.

In the present invention, the light-transmitting particle is an organic polymer having a core particle/shell layer structure, and the refractive index ($n_1$) of the core particle is higher than the refractive index ($n_2$) of the shell layer. $n_1$-$n_2$ is preferably from 0.01 to 0.19, more preferably from 0.03 to 0.15, still more preferably from 0.05 to 0.10.

The refractive index of the light-transmitting particle can be determined as follows. The light-transmitting particle is dispersed in equal amounts in solvents prepared by changing he mixing ratio of two kinds of solvents differing in the refractive index and thereby varying the refractive index, the turbidity is measured, and the refractive index of the solvent when the turbidity becomes minimum is measured by an Abbe refractometer.

The refractive index ($n_1$) of the core particle is from 1.54 to 1.65, preferably from 1.55 to 1.60, more preferably from 1.57 to 1.60.

Specific examples of the core particle include a resin particle such as crosslinked methyl methacrylate-styrene copolymer particle, crosslinked polystyrene particle, crosslinked acrylate-styrene copolymer particle, melamine/formaldehyde resin particle and benzoguanamine/formaldehyde resin particle. Among these, a crosslinked polystyrene particle and a crosslinked methyl methacrylate-styrene copolymer particle are preferred.

The refractive index ($n_2$) of the shell layer is from 1.46 to 1.53, preferably from 1.47 to 1.51, more preferably from 1.49 to 1.50. The shell layer preferably contains at least one polymerization product selected from a polymerization product of an acrylic acid ester, a polymerization product of a methacrylic acid ester, and a copolymerization product of an acrylic acid ester and a methacrylic acid ester.

Specific preferred examples of the polymerization product include a resin such as crosslinked polymethyl methacrylate, crosslinked methyl methacrylate-styrene copolymer, crosslinked methyl methacrylate-methyl acrylate copolymer and crosslinked acrylate-styrene copolymer. Among these, a crosslinked polymethyl methacrylate and a crosslinked methyl methacrylate-styrene copolymer are preferred.

The thickness of the shell layer is from 10 to 2,000 nm, preferably from 10 to 1,000 nm, more preferably from 10 to 300 nm, still more preferably from 10 to 90 nm. If the thickness of the shell layer is less than 10 nm, the affinity for the light-transmitting resin is decreased and after the endurance test, the light-transmitting resin and the light-transmitting particle are separated at their interface to cause a change of internal scattering property, whereas if the thickness of the shell layer exceeds 2,000 nm, the haze value is decreased and the display contrast becomes very low. By setting the thickness of the shell layer to 90 nm or less, refraction of light scarcely occurs between the core particle and the shell layer and by virtue of light scattering at a wind angle, reduction in the display contrast can be more unfailingly suppressed.

The amount of the light-transmitting particle added is preferably from 5 parts by mass to less than 45 parts by mass, more preferably from 5 to 30 parts by mass, and most preferably from 10 to 25 parts by mass, per 100 parts by mass of the light-transmitting resin. With this amount added, when the film is used on the surface of a liquid crystal display device (LCD), appropriate internal scattering is obtained, image blurring and white turbid surface as well as reduction in the display contrast are little caused, and good performance in terms of glaring is ensured.

The mass of the light-transmitting particle per area is preferably from 5 to 2,500 mg/m$^2$, more preferably from 10 to 1,000 mg/m$^2$, still more preferably from 100 to 700 mg/m$^2$.

At least two kinds of light-transmitting particles are preferably used as the light-transmitting particle. The at least two kinds of light-transmitting particles are preferably different in the particle diameter or refractive index from each other. The preferred embodiment is an embodiment containing two or more kinds of light-transmitting particles having a core particle/shell layer structure or an embodiment containing a light-transmitting particle having a core particle/shell layer structure and further containing a light-transmitting particle not having a core particle/shell layer structure and having a single refractive index (the refractive index is preferably from 1.46 to 1.65, more preferably from 1.49 to 1.60).

Assuming that out of the at least two kinds of light-transmitting particles, one particle is particle A and the other is particle B, the refractive index difference between the core particle of particle A and the particle B may be 0, but the refractive index preferably differs from one another.

It is preferred to take an embodiment where one of the core particle of particle A and the particle B has a refractive index lower than that of the matrix and the other has a refractive index higher than that of the matrix. For example, a high refractive index particle out of the core particle of particle A and the particle B preferably has a refractive index higher than that of the light-transmitting resin by 0.010 to 0.050, more preferably by 0.010 to 0.030, and the low refractive index-side particle preferably has a refractive index lower than that of the light-transmitting resin by 0.010 to 0.050, more preferably by 0.010 to 0.030. By virtue of having a refractive index difference between the core particle of particle A and the particle B, internal scattering and surface profile become easy to control.

In the present invention, an embodiment containing only two kinds of particles, that is, particle A and particle B, is preferred, but particle C having an average particle diameter the same as either one of particle A and particle B may be further contained.

A resin particle and/or an inorganic fine particle can be used as the light-transmitting particles B and C.

Specific examples of the particles B and C include a resin particle such as crosslinked polymethyl methacrylate particle, crosslinked methyl methacrylate-styrene copolymer particle, crosslinked polystyrene particle, crosslinked methyl methacrylate-methyl acrylate copolymer particle, crosslinked acrylate-styrene copolymer particle, melamine/formaldehyde resin particle and benzoguanamine/formaldehyde resin particle. Among these, a crosslinked polystyrene particle, a crosslinked polymethyl methacrylate particle and a crosslinked methyl methacrylate-styrene copolymer particle are preferred. Furthermore, a so-called surface-modified particle obtained by chemically binding a compound containing a fluorine atom, a silicon atom, a carboxyl group, a hydroxyl group, an amino group, a sulfonic acid group, a phosphoric acid group or the like to the surface of the resin particle above, or a particle obtained by binding a nano-size inorganic fine particle such as silica or zirconia to the surface, may also be preferably used. Specific preferred examples of the inorganic fine particle include a silica particle and an alumina particle, with a silica particle being more preferred.

As for the average particle diameter of the light-transmitting particle, in both cases where two or more particles are adjacently present in the coating film and where particles are independently present, the average particle diameter indicates a primary particle diameter. However, in the case where aggregating inorganic particles having a primary particle diameter of about 0.1 μm are dispersed in a coating solution as a secondary particle to a size satisfying the particle size above and then coated, the secondary particle diameter is used as the average particle diameter.

The shape of the particle may be either truly spherical or amorphous. As for the particle size distribution, in view of the control of haze value and diffusion and the homogeneity of coated surface state, a monodisperse particle is preferred. The CV value indicating the uniformity of the particle diameter is preferably 15% or less, more preferably from 13% or less, still more preferably 10% or less. Furthermore, when a particle having a particle diameter larger than the average particle diameter by 33% or more is defined as a coarse particle, the percentage of this coarse particle in the number of all particles is preferably 1% or less, more preferably 0.8% or less, still more preferably 0.4% or less. If the percentage of the coarse particle is too large, the roughness of the surface is intensely recognized to give a bumped texture feeling and this is not preferred.

Also, for example, when a particle having a particle diameter smaller than the average particle diameter by 16% or more is defined as a microparticle, the percentage of the microparticle in the number of all particles is preferably 10% or less, more preferably 6% or less, still more preferably 4% or less. The particle having such a particle diameter distribution can be obtained by performing classification after a normal synthesis reaction, and when the number of classifications is increased or the level of classification is elevated, a particle having a more preferred distribution can be obtained. For the classification, there may be used a method such as air classification, centrifugal classification, precipitation classification, filtration classification and electrostatic classification.

For the measurement of the particle diameter or particle size distribution of the light-transmitting particle, an arbitrary measuring method may be applied. For example, the particle size distribution of the particle is measured by a Coulter counter method, and the measured distribution is converted into a particle number distribution. The average particle diameter may be calculated from the obtained particle distribution or may be measured using a light-scattering method or an electron micrograph.

In the antiglare film of the present invention, the haze value attributable to surface scattering is preferably from 0 to 10%, more preferably from 0.5 to 5%. If the surface haze is excessively large, the denseness of black is worsened, whereas if it is too small, the antiglare property becomes bad.

In the antiglare film of the present invention, the centerline average roughness Ra is preferably from 0.05 to 0.25 µm, more preferably from 0.10 to 0.20 µm, and most preferably from 0.12 to 0.18 µm. The centerline average roughness Ra can be measured in accordance with JIS-B0601 (1982). If Ra is excessively large, the denseness of black and bright-room contrast are worsened, whereas if Ra is too small, the antiglare property becomes bad.

In the antiglare film of the present invention, by setting the surface haze and surface roughness to fall in the above-described ranges, an antiglare film with excellent denseness of black can be obtained.

In order to obtain a surface profile suitable for satisfying both the antiglare property and the denseness of black, the average distance Sm of irregularities is also important. Sm is preferably from 50 to 350 µm, more preferably from 60 to 200 µm or from 250 to 350 µm, and most preferably from 60 to 150 µm or from 300 to 350 µm. The average distance Sm of irregularities can be measured in accordance with JIS B0601 (1994). If Sm is excessively large, the antiglare property becomes bad, whereas if Sm is too small, the denseness of black is worsened. If Sm is from more than 200 µm to less than 250 µm, the surface roughness is too strong and the outer appearance is bad.

It is more preferred that both Ra and Sm are in the above-described preferred ranges.

In order to improve the bright-room contrast, the average tilt angle θa is also preferably controlled to a specific range. The average tilt angle θa is preferably from 0.5 to 3.0°, more preferably from 0.6 to 2.5°, and most preferably from 0.6 to 2.0°. The maximum value of the tilt angle distribution is preferably 0.3° or less, more preferably 0.28° or less, and most preferably 0.25° or less. If the average tilt angle is excessively large, the denseness of black is worsened, whereas if the average tilt angle is too small, the antiglare property becomes bad.

The average tilt angle θa of the optical film of the present invention is determined by the following method. That is, vertexes of a triangle having an area of 0.5 to 2 square micrometers are supposed on a transparent film substrate surface (support surface) and assuming that the tilt angle is an angle made between a perpendicular line vertically extending upward from the support and a normal line in a plane of a triangle formed by three points at which three perpendicular lines vertically extending upward from the vertexes are crossing with the film surface, an average of all measurement points when measuring an area of 250,000 square micrometers (0.25 square millimeters) by dividing it into the above-described triangles is calculated as an average tilt angle.

Figure 4A:
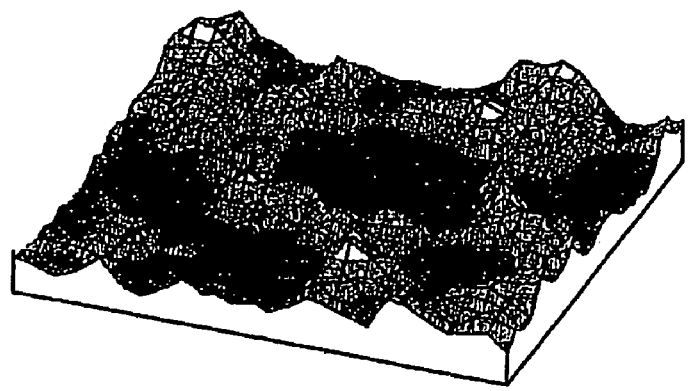
FIGS. 4A, 4B and 4C are schematic views for explaining the outline of the method for measuring the tilt angle.
Figure 4B:
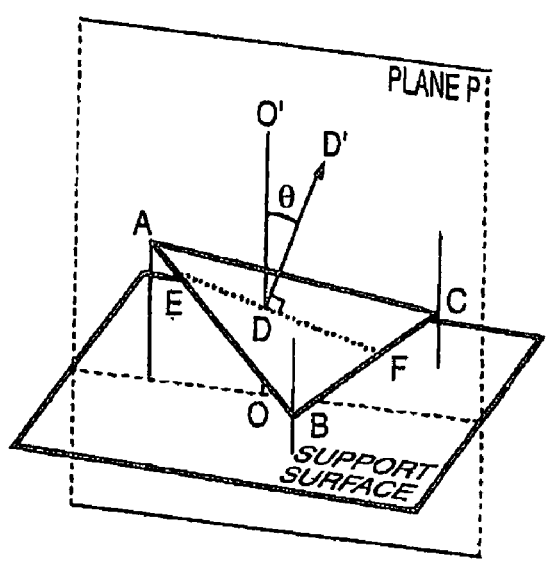
Figure 4C:
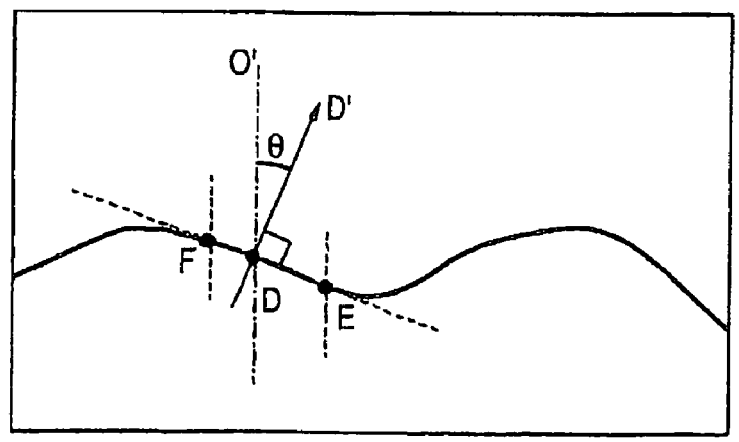

The method for measuring the tilt angle is described in more detail. As shown in FIG. 4A, the film is divided into meshes having an area of 0.5 to 2 square micrometers. FIG. 4B is a view where three points out of the divided meshes are extracted. Perpendicular lines are vertically extended upward from these three points on the support and the points where these three points are crossing with the surface are designated as A, B and C. The angle θ between the normal line DD' of the triangular ABC plane and the perpendicular line OO' vertically extending upward from the support is defined as the tilt angle. FIG. 4C is a cross-sectional view of the film cut at the plane P containing the points O', D and D'. The line segment EF is an intersection line between the triangle ABC and the plane P. The measurement area is preferably 250,000 square micrometers (0.25 square millimeters) or more on the support, and this plane is divided into triangles on the support and measured to determine the tilt angle. Some measuring devices are known, but one example is described here. The measurement using Model SXM520-AS150 manufactured by Micromap Corp. (U.S.A.) as the measuring device is described. For example, when the objective lens has a magnification of 10 times, the measuring unit of the tilt angle is 0.8 square micrometers and the measurement range is 500,000 square micrometers (0.5 square millimeters). When the magnification of the objective lens is increased, the measuring unit and the measurement range become small in proportion thereto. The measured data are analyzed using a software such as MAT-LAB, whereby the tilt angle distribution can be calculated. The average tilt angle can be calculated based on the data obtained.

In the antiglare film of the present invention, the haze ascribable to internal scattering is preferably from 8 to 90%, more preferably from 10 to 40%, and most preferably from 10 to 30%.

The surface haze and internal haze can be measured by the following procedure.

(1) The entire haze value (H) of the film is measured in accordance with JIS-K7136.

(2) After adding several silicone oil drops on the surface and back surface of the film, the film is sandwiched from front and back by two 1 mm-thick glass plates (Microslide Glass No. S 9111, produced by Matsunami K.K.) and put into optically complete contact with two glass plates to provide a surface haze-removed state, and the haze is measured. From this value, the haze separately measured by interposing only the silicone oil between two glass plates is subtracted, and the value obtained is calculated as the internal haze (Hi).

(3) The internal haze (Hi) calculated in (2) above is subtracted from the entire haze (H) measured in (1) above, and the value obtained is calculated as the surface haze (Hs).

In the antiglare film of the present invention, the sum of image clarities measured by four kinds of optical combs defined in JIS (Japanese Industrial Standards) K7105 (1999) is preferably 300% or less, more preferably from 80 to 200%, and most preferably from 90 to 150%. By setting the internal haze and image clarity to fall in these ranges, two performances in terms of preventing reduction in the surface contrast and glaring can be practically satisfied.

The image clarity (%) can be measured, for example, using a measuring device such as ICM-1T manufactured by Suga Test Instruments Co., Ltd.

<Preparation of Light-Transmitting Particle>

Examples of the production method of the light-transmitting particle for use in the present invention include a suspension polymerization method, an emulsion polymerization method, a soap-free emulsion polymerization method, a dispersion polymerization method and a seed polymerization method, and any of these production methods may be employed. These methods may be performed by referring to the methods described, for example, in Takayuki Ohtsu and Masaetsu Kinoshita, *Kobunshi Gosei no Jikken Ho* (*Experimental Technique for the Synthesis of Polymer*), page 130 and pages 146 to 147, Kagaku Dojin Sha, *Gosei Kobunshi* (*Synthetic Polymer*), Vol. 1, pp. 246-290, ibid., Vol. 3, pp. 1-108, Japanese Patents 2,543,503, 3,508,304, 2,746,275, 3,521,560 and 3,580,320, JP-A-10-1561, JP-A-7-2908, JP-A-5-297506 and JP-A-2002-145919. In the particle having a core particle/shell layer structure of the present invention, a small-size particle composed of only the shell layer components is generated at the time of providing a shell layer and therefore, it is preferred to perform classification.

<Binder for Formation of Matrix of Antiglare Layer>

The binder for forming the matrix constituting the antiglare layer is not particularly limited but preferably contains a light-transmitting resin. The light-transmitting resin is preferably a light-transmitting resin having a saturated hydrocarbon chain or polyether chain as the main chain after curing by ionizing radiation. Also, the main binder polymer after curing preferably has a crosslinked structure.

In order to obtain the necessary internal scattering, the refractive indexes of the core particle and light-transmitting resin (matrix) are preferably adjusted. The absolute value of the refractive index difference between the core particle and the light-transmitting resin is preferably from 0.001 to 0.050, more preferably from 0.015 to 0.040, and most preferably from 0.010 to 0.030.

The refractive index of the binder can be quantitatively evaluated, for example, by directly measuring the refractive index with an Abbe refractometer or by the spectral reflection spectrum or spectral ellipsometry measurement.

The binder polymer having a saturated hydrocarbon chain as the main chain after curing is preferably an ethylenically unsaturated monomer selected from the compounds of the first group described below or a polymer thereof.

Also, the polymer having a polyether chain as the main chain is preferably an epoxy-based monomer selected from the compounds of the second group described below or a polymer obtained by the ring-opening polymerization of such a monomer. A polymer composed of a mixture of these monomers is also preferred.

In the present invention, as the compound of the first group, the binder polymer having a saturated hydrocarbon chain as the main chain and at the same time, having a crosslinked structure is preferably a (co)polymer of a monomer having two or more ethylenically unsaturated groups. In order to raise the refractive index, the monomer preferably contains, in its structure, an aromatic ring or at least one atom selected from a halogen atom except for fluorine, a sulfur atom, a phosphorus atom and a nitrogen atom.

Examples of the monomer having two or more ethylenically unsaturated groups, which is used in the binder polymer for forming the antiglare layer, include an ester of polyhydric alcohol and (meth)acrylic acid (e.g., ethylene glycol di(meth)acrylate, 1,4-cyclohexane diacrylate, pentaerythritol tetra(meth)acrylate, pentaerythritol tri(meth)acrylate, trimethylolpropane tri(meth)acrylate, trimethylolethane tri(meth)acrylate, dipentaerythritol tetra(meth)acrylate, dipentaerythritol penta(meth)acrylate, dipentaerythritol hexa(meth)acrylate, pentaerythritol hexa(meth)acrylate, 1,2,3-cyclohexane tetramethacrylate, polyurethane polyacrylate, polyester polyacrylate); vinylbenzene and a derivative thereof (e.g., 1,4-divinylbenzene, 2-acryloylethyl 4-vinylbenzoate, 1,4-divinylcyclohexanone); a vinylsulfone (e.g., divinylsulfone); and a (meth)acrylamide (e.g., methylenebisacrylamide).

Examples of the resin having two or more ethylenically unsaturated groups include a resin having a relatively low molecular weight, such as polyester resin, polyether resin, acrylic resin, epoxy resin, urethane resin, alkyd resin, spiroacetal resin, polybutadiene resin and polythiol polyene resin, and an oligomer or prepolymer of a polyfunctional compound such as polyhydric alcohol. Two or more kinds of these monomers may be used in combination. The resin having two or more ethylenically unsaturated groups is preferably contained in an amount of 10 to 100 mass % based on the total amount of the binder.

The polymerization of such a monomer having ethylenically unsaturated groups can be performed by ionizing radiation or heating in the presence of a radical photopolymerization initiator or a radical thermal polymerization initiator. Accordingly, a coating solution containing the monomer having ethylenically unsaturated groups, a radical photopolymerization initiator or radical thermal polymerization initiator and the particle and further containing, if desired, an inorganic filler, a coating aid, other additives, an organic solvent and the like, is prepared, and the coating solution is coated on a transparent support and cured by a polymerization reaction under ionizing radiation or heating to form an antiglare layer. It is also preferred to perform the polymerization by using ionizing radiation curing and heat curing in combination. As for the photopolymerization and thermal polymerization initiators, a commercially available compound may be used, and such a compound is described, for example, in *Saishin UV Koka Gijutsu* (*Latest UV Curing Technology*), page 159, Kazuhiro Takausu (publisher), Technical Information Institute Co., Ltd. (publishing office) (1991), and catalogues of "photopolymerization initiator" by Ciba Special Chemicals (for example, IRGACURE Series and DAROCURE Series).

In the present invention, as the compound of the second group, the following epoxy-based compound is preferably used for reducing the curing shrinkage of the cured film. As for the monomers having an epoxy group, a monomer having two or more epoxy groups per molecule is preferred, and examples thereof include epoxy-based monomers described in JP-A-2004-264563, JP-A-2004-264564, JP-A-2005-37737, JP-A-2005-37738, JP-A-2005-140862, JP-A-2005-140863 and JP-A-2002-322430.

For reducing the curing shrinkage, it is preferred to contain the monomers having an epoxy group in an amount of 20 to 100 mass %, more preferably from 35 to 100 mass %, still more preferably from 50 to 100 mass %, based on all binders constituting the layer.

Examples of the photo-acid generator for generating a cation by the action of light to polymerize the epoxy monomers and compounds include an ionic compound such as triarylsulfonium salt and diaryliodonium salt, and a nonionic compound such as nitrobenzyl sulfonate. Various known photo-acid generators such as compounds described, for example, in *Imaging Yo Yuki Zairyo* (*Organic Materials for Imaging*), compiled by Yuki Electronics Zairyo Kenkyukai, Bunsin Shuppan-sha (1997) may be used. Above all, a sulfonium salt and an iodonium salt are preferred, and the counter ion is preferably, for example, $PF_6^-$, $SbF_6^-$, $AsF_6^-$ or $B(C_6F_5)_4^-$.

The antiglare layer is preferably a layer formed from a polymer or copolymer composed of at least one member of the following (A1) and (A2) or a mixed polymer of these polymer and copolymer. By virtue of this construction of the antiglare layer, particularly when the film thickness of the antiglare layer is from 8 to 35 μm, curling due to curing shrinkage of the antiglare layer can be prevented.

(A1): An alkyl acrylate containing an alkyl group having at least either one group of a hydroxyl group and an acryloyl group.

(A2): An alkyl methacrylate containing an alkyl group having at least either one group of a hydroxyl group and an acryloyl group.

A more preferred embodiment is an embodiment where the antiglare layer is a layer formed from a polymer or copolymer composed of at least one member of the following (A1') and (A2') or a mixed polymer of these polymer and copolymer.

(A1'): An alkyl acrylate containing an alkyl group having a hydroxyl group.

(A2'): An alkyl methacrylate containing an alkyl group having a hydroxyl.

When such a material for forming the antiglare layer is used, the degree of curling generated can be suppressed within 30 mm. The degree of curling generated is preferably within 20 mm, more preferably within 10 mm.

The alkyl group in (A1) and (A2) above is, for example, an alkyl group having a carbon number of 1 to 10 and may be linear or branched. Examples of the components (A1) and (A2) include a polymer or copolymer containing a repeating unit of formula (1) and a mixture of these polymer and copolymer.

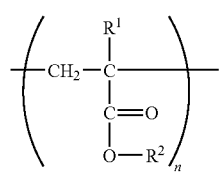

(1)

In formula (1), R' is —H or —$CH_3$, $R^2$ is —$CH_2CH_2OX$ or a group represented by the following formula (2), and X is —H or an acryloyl group represented by the following formula (3).

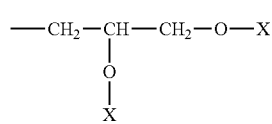

(2)

In formula (2), X is —H or an acryloyl group represented by the following formula (3), and the plurality of X's may be the same or different.

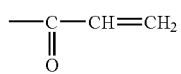

(3)

Examples of the polymer or copolymer containing a repeating unit of formula (1) include a polymer or copolymer formed of at least one monomer selected from the group consisting of 2,3-dihydroxypropyl acrylate, 2,3-diacryloyloxypropyl acrylate, 2-hydroxy-3-acryloyloxypropyl acrylate, 2-acryloyloxy-3-hydroxypropyl acrylate, 2,3-dihydroxypropyl methacrylate, 2,3-diacryloyloxypropyl methacrylate, 2-hydroxy-3-acryloyloxypropyl methacrylate, 2-acryloyloxy-3-hydroxypropyl methacrylate, 2-hydroxyethyl acrylate, 2-acryloyloxyethyl acrylate, 2-hydroxyethyl methacrylate and 2-acryloyloxy methacrylate.

As for the layer-forming material containing a polymer or copolymer component formed from at least either one of (A1) and (A2) or a mixed polymer component of these polymer and copolymer, at least either one of urethane acrylate and urethane methacrylate and at least either one of polyol acrylate and polyol methacrylate are preferably mixed and used.

The polymerization initiator is preferably used, in terms of total amount of polymerization initiators, in the range from 0.1 to 15 parts by mass, more preferably from 1 to 10 parts by mass, per 100 parts by mass of the compound of the first or second group.

<Polymer Compound of Antiglare Layer>

The antiglare layer of the present invention may contain a polymer compound. By the addition of a polymer compound, the curing shrinkage may be reduced or the viscosity of the coating solution may be adjusted.

The polymer compound has already formed a polymer at the time of addition to the coating solution, and examples of the polymer compound which is preferably used include cellulose esters (e.g., cellulose triacetate, cellulose diacetate, cellulose propionate, cellulose acetate propionate, cellulose acetate butyrate, cellulose nitrate), urethane acrylates, polyester acrylates, (meth)acrylic acid esters (e.g., methyl methacrylate/methyl(meth)acrylate copolymer, methyl methacrylate/ethyl(meth)acrylate copolymer, methyl methacrylate/butyl(meth)acylate copolymer, methyl methacrylate/styrene copolymer, methyl methacrylate/(meth)acrylic acid copolymer, polymethyl methacrylate), and resins such as polystyrene.

In view of the effect of reducing curing shrinkage or the effect of increasing the viscosity of the coating solution, the polymer compound is preferably contained in an amount of 1 to 50 mass %, more preferably from 5 to 40 mass %, based on all binders contained in the layer containing the polymer compound. Also, the molecular weight of the polymer compound is, in terms of the mass average molecular weight, preferably from 3,000 to 400,000, more preferably from 5,000 to 300,000, still more preferably from 5,000 to 200,000.

<Inorganic Filler of Antiglare Layer>

In addition to the light-transmitting particle above, the antiglare layer of the present invention may contain an inorganic filler according to the purpose such as antiprecipitation of the light-transmitting particle, control of the refractive index, adjustment of the film strength, reduction of the curing shrinkage and, in the case of providing a low refractive index layer, decrease in the refractive index. In the case of using a silica particle as the inorganic filler, when a particle having an average primary particle diameter of 0.5 μm or less is used, a film with high transparency can be formed. It is also preferred to contain a high refractive index inorganic microfiller that is composed of an oxide containing at least one metal element selected from titanium, zirconium, aluminum, indium, zinc, tin and antimony and has an average primary particle diameter of generally 0.2 μm or less, preferably 0.1 μm or less, more preferably from 0.06 μm to 1 nm.

In the case where the refractive index of the matrix needs to be decreased to adjust the refractive index difference from the light-transmitting particle or for the purpose of preventing precipitation of the light-transmitting particle, a low refractive index inorganic microfiller such as silica fine particle or hollow silica fine particle may be used as the inorganic filler. The preferred particle diameter thereof is the same as the above-described high refractive index inorganic microfiller.

It is also preferred that the surface of the inorganic filler is subjected to a silane coupling treatment or a titanium coupling treatment. A surface-treating agent having a functional group capable of reacting with the binder species on the filler surface is preferably used.

The amount of the inorganic filler added is preferably from 10 to 90 mass %, more preferably from 20 to 80 mass %, still more preferably from 30 to 75 mass %, based on the entire mass of the antiglare layer.

Incidentally, the inorganic filler has a particle diameter sufficiently smaller than the light wavelength. Therefore, scattering is not caused and a dispersion obtained by dispersing the filler in the binder polymer has a property as an optically uniform substance.

<Surfactant of Antiglare Layer>

As regards the antiglare layer, in order to ensure the surface state uniformity particularly in terms of coating unevenness, drying unevenness, point defect and the like, the coating composition for antiglare layer preferably contains either one or both of fluorine-containing and silicone-containing surfactants. Above all, a fluorine-containing surfactant is preferably used, because an effect of improving a surface failure such as coating unevenness, drying unevenness and point defect in the antiglare film of the present invention is brought out with a smaller amount added. The purpose is to impart suitability for high-speed coating while elevating the surface state uniformity and thereby raise the productivity. Preferred examples of the fluorine-containing surfactant include the compounds described in JP-A-2007-188070, paragraphs [0049] to [0074].

The amount added of the surfactant (particularly a fluorine-containing polymer) for use in the antiglare layer of the present invention is from 0.001 to 5 mass %, preferably from 0.005 to 3 mass %, more preferably from 0.01 to 1 mass %, based on the coating solution. When the amount of the surfactant added is 0.001 mass % or more, a sufficient effect can be obtained, and when the amount added is 5 mass % or less, drying of the coating film can be sufficiently effected and good performance as a coating film (for example, reflectance and scratch resistance) can be obtained.

<Organic Solvent of Coating Solution for Antiglare Layer>

An organic solvent may be added to the coating composition for forming the antiglare layer.

Examples of the organic solvent include an alcohol-based organic solvent such as methanol, ethanol, n-propanol, isopropanol, n-butanol, isobutanol, secondary butanol, tertiary butanol, isoamyl alcohol, 1-pentanol, n-hexanol and methyl amyl alcohol; a ketone-based organic solvent such as methyl isobutyl ketone (MIBK), methyl ethyl ketone (MEK), diethyl ketone, acetone, cyclohexanone and diacetone alcohol; an ester-based organic solvent such as methyl acetate, ethyl acetate, n-propyl acetate, isopropyl acetate, isobutyl acetate, n-butyl acetate, isoamyl acetate, n-amyl acetate, methyl propionate, ethyl propionate, methyl butyrate, ethyl butyrate, methyl lactate and ethyl lactate; an ether- or acetal-based organic solvent such as 1,4-dioxane, tetrahydrofuran, 2-methylfuran, tetrahydropyrane and diethylacetal; a hydrocarbon-based organic solvent such as hexane, heptane, octane, isooctane, ligroin, cyclohexane, methylcyclohexane, toluene, xylene, ethylbenzene, styrene and divinylbenzene; a hydrocarbon halide-based organic solvent such as carbon tetrachloride, chloroform, methylene chloride, ethylene chloride, 1,1, 1-trichloroethane, 1,1,2-trichloroethane, trichloroethylene, tetrachloroethylene and 1,1,1,2-tetrachloroethane; a polyhydric alcohol- or its derivative-based organic solvent such as ethylene glycol, ethylene glycol monomethyl ether, ethylene glycol monoethyl ether, ethylene glycol monoacetate, diethylene glycol, propylene glycol, dipropylene glycol, butanediol, hexylene glycol, 1,5-pentanediol, glycerin monoacetate, glycerin ethers and 1,2,6-hexanetriol; a fatty acid-based organic solvent such as formic acid, acetic acid, propionic acid, butyric acid, isobutyric acid, isovaleric acid and lactic acid; a nitrogen compound-based organic solvent such as formamide, N,N-dimethylformamide, acetamide and acetonitrile; and a sulfur compound-based organic solvent such as dimethylsulfoxide.

Among these organic solvents, preferred are methyl isobutyl ketone, methyl ethyl ketone, cyclohexanone, acetone, toluene, xylene, ethyl acetate and 1-pentanol. Also, for the purpose of controlling the aggregating property, an alcohol-based or polyhydric alcohol-based solvent may be appropriately mixed and used. One of these organic solvents may be used alone or a mixture thereof may be used. The organic solvent is preferably contained in an amount of, in terms of the total amount of organic solvents in the coating composition, from 20 to 90 wt %, more preferably from 30 to 80 wt %, and most preferably from 40 to 70 wt %. In order to stabilize the surface profile of the antiglare layer, a solvent having a boiling point of less than 100° C. and a solvent having a boiling point of 100° C. or more are preferably used in combination.

<Curing of Antiglare Layer>

The antiglare layer can be formed by applying the coating solution onto a support and subjecting the coating to light irradiation, electron beam irradiation, heat treatment or the like to cause a crosslinking or polymerization reaction. In the case of ultraviolet irradiation, an ultraviolet ray emitted from a light source such as ultrahigh-pressure mercury lamp, high-pressure mercury lamp, low-pressure mercury lamp, carbon arc, xenon arc or metal halide lamp may be utilized. As for the curing with ultraviolet ray, the curing is preferably performed in an atmosphere adjusted to an oxygen concentration of 4 vol % or less, more preferably 2 vol % or less, and most preferably 0.5 vol % by volume or less, by nitrogen purging or the like.

Layers other than the antiglare layer are described below.

<Surface Conditioning Layer>

In the present invention, a surface conditioning layer may be formed for conditioning the uneven surface of the antiglare layer. The surface conditioning layer can form smooth irregularities by filling and smoothing fine irregularities present along the uneven geometry on a scale of 1/10 or less of the irregularity scale (peak height and peak-to-peak distance of irregularities) in the surface roughness forming the uneven geometry of the antiglare layer or can adjust the peak-to-peak distance and peak height of irregularities and the frequency (number) of peaks. By providing the surface conditioning layer, the centerline average roughness Ra of the antiglare layer can be reduced by 0.04 μm or more. The film thickness (at the curing) of the surface conditioning layer is preferably from 0.5 to 12 μm. More preferably, the lower limit is 3 μm or more and the upper limit is 8 μm or less.

In the surface conditioning layer, the same as the light-transmitting resin (preferably a (co)polymer of a monomer having two or more ethylenically unsaturated groups) of the antiglare layer may be used as the binder.

Also, as to the coating solution for forming the surface conditioning layer, a coating solution containing a monomer for forming the light-transmitting resin, a polymerization initiator, a solvent and other additives (for example, a polymer compound described above) may be used.

<Low Refractive Index Layer>

The antiglare film of the present invention preferably has a low refractive index layer for reducing the reflectance. The refractive index of the low refractive index layer is preferably from 1.20 to 1.46, more preferably from 1.25 to 1.46, still more preferably from 1.30 to 1.40. The thickness of the low refractive index layer is preferably from 50 to 200 nm, more preferably from 70 to 100 nm. The haze of the low refractive index layer is preferably 3% or less, more preferably 2% or less, and most preferably 1% or less.

Preferred embodiments of the formulation for the cured product working out to the low refractive index layer include:

(1) a composition containing a fluorine-containing compound having a crosslinking or polymerizable functional group;

(2) a composition with the main component being a hydrolysis condensate of a fluorine-containing organosilane material; and (3) a composition containing a monomer having two or more ethylenically unsaturated groups and an inorganic fine particle having a hollow structure.

The compositions (1) and (2) also preferably contain an inorganic fine particle and furthermore, use of an inorganic fine particle having a low refractive index and having a hollow structure is particularly preferred in view of, for example, decreasing the refractive index or adjusting the amount added of inorganic fine particle and the refractive index.

(1) Fluorine-Containing Compound Having Crosslinking or Polymerizable Functional Group The fluorine-containing compound having a crosslinking or polymerizable functional group includes a copolymer of a fluorine-containing monomer with a monomer having a crosslinking or polymerizable functional group. Specific examples of the fluorine-containing monomer are described, for example, in JP-A-2003-222702 and JP-A-2003-183322.

As described in JP-A-2000-17028, a curing agent having a polymerizable unsaturated group may be appropriately used in combination with the above-described polymer. Also, as described in JP-A-2002-145952, a combination use with a fluorine-containing compound having a polyfunctional polymerizable unsaturated group is preferred. Examples of the compound having a polyfunctional polymerizable unsaturated group include the above-described monomers having two or more ethylenically unsaturated groups. Furthermore, a hydrolysis condensate of an organosilane described in JP-A-2004-170901 is also preferred, and a hydrolysis condensate of an organosilane containing a (meth)acryloyl group is more preferred. These compounds are preferred because a great effect is brought about on the scratch resistance by the combination use particularly when the polymerizable unsaturated group-containing compound is used in the polymer body.

In the case where the polymer used alone has no sufficient curability by itself, the necessary curability can be imparted by blending a crosslinking compound. For example, when the polymer body contains a hydroxyl group, various amino compounds are preferably used as the curing agent. The amino compound used as the crosslinking compound is, for example, a compound having two or more groups in total of either one or both of a hydroxyalkylamino group and an alkoxyalkylamino group, and specific examples thereof include a melamine-based compound, a urea-based compound, a benzoguanamine-based compound and a glycoluril-based compound. For the curing of such a compound, an organic acid or a salt thereof is preferably used.

(2) Composition with Main Component Being Hydrolysis Condensate of Fluorine-Containing Organosilane Material A composition with the main component being a hydrolysis condensate of a fluorine-containing organosilane compound is also preferred, because its refractive index is low and the hardness of the coating film surface is high. A condensate between a compound having hydrolyzable silanol at one end or both ends with respect to a fluorinated alkyl group and a tetraalkoxysilane is preferred. Specific examples of the composition are described in JP-A-2002-265866 and JP-A-2002-317152.

(3) Composition Containing Monomer Having Two or More Ethylenically Unsaturated Groups and Inorganic Fine Particle Having Hollow Structure A still another preferred embodiment is a low refractive index layer composed of a low refractive index particle and a binder. The low refractive index particle may be either organic or inorganic, but a hollow particle having a void in the inside is preferred. The hollow particle is preferably a hollow silica particle, and specific examples thereof include a silica-based particle described in JP-A-2002-79616. The refractive index of the particle is preferably from 1.15 to 1.40, more preferably from 1.20 to 1.30. Examples of the binder include monomers having two or more ethylenically unsaturated groups, which are described above for the antiglare layer.

In the low refractive index layer of the present invention, a polymerization initiator described above for the antiglare layer is preferably added. In the case of containing a radical polymerizable compound, the polymerization initiator can be used in an amount of 1 to 10 parts by mass, preferably from 1 to 5 parts by mass, based on the compound.

In the low refractive index layer of the present invention, an inorganic particle can be used in combination. For imparting scratch resistance, a fine particle having a particle diameter of 15 to 150%, preferably from 30 to 100%, more preferably from 45 to 60%, of the thickness of the low refractive index layer may be used.

In the low refractive index layer of the present invention, a known polysiloxane-based or fluorine-based antifouling agent, a slipping agent and the like may be appropriately added for the purpose of imparting properties such as antifouling property, water resistance, chemical resistance and slipperiness.

As for the additive having a polysiloxane structure, addition of a reactive group-containing polysiloxane {for example, "KF-100T", "X-22-169AS", "KF-102", "X-22-3701IE", "X-22-164B", "X-22-5002", "X-22-173B", "X-22-174D", "X-22-167B", "X-22-161AS" (trade names), all produced by Shin-Etsu Chemical Co., Ltd.; "AK-5", "AK-30" and "AK-32" (trade names), all produced by Toagosei Co., Ltd.; and "SILAPLANE FM0725" and "SILAPLANE FM0721" (trade names), both produced by Chisso Corporation} is also preferred. Furthermore, silicone-based compounds shown in Tables 2 and 3 of JP-A-2003-112383 may also be preferably used.

The fluorine-based compound is preferably a compound having a fluoroalkyl group. The fluoroalkyl group preferably has a carbon number of 1 to 20, more preferably from 1 to 10, and may be linear (e.g., —$CF_2CF_3$, —$CH_2(CF_2)_4H$, —$CH_2(CF_2)_8CF_3$, —$CH_2CH_2(CF_2)_4H$), may have a branched structure (e.g., $CH(CF_3)_2$, $CH_2CF(CF_3)_2$, $CH(CH_3)CF_2CF_3$, $CH(CH_3)(CF_2)_5CF_2H$), may have an alicyclic structure (preferably a 5- or 6-membered ring, for example, a perfluorocyclohexyl group, a perfluorocyclopentyl group or an alkyl group substituted by such a group) or may have an ether bond (e.g., $CH_2OCH_2CF_2CF_3$, $CH_2CH_2OCH_2C_4F_8H$, $CH_2CH_2OCH_2CH_2C_8F_{17}$, $CH_2CH_2OCF_2CF_2OCF_2CF_2H$). A plurality of the fluoroalkyl groups may be contained within the same molecule.

The fluorine-based compound preferably further has a substituent that contributes to the bond formation or compatibility with the low refractive index layer film. A plurality of substituents, which may be the same or different, are preferably present. Preferred examples of the substituent include an acryloyl group, a methacryloyl group, a vinyl group, an aryl group, a cinnamoyl group, an epoxy group, an oxetanyl group, a hydroxyl group, a polyoxyalkylene group, a carboxyl group and an amino group. The fluorine-based compound may be a polymer or oligomer with a compound containing no fluorine atom, and the molecular weight is not particularly limited. The fluorine atom content of the fluorine-based compound is not particularly limited but is preferably 20 mass % or more, more preferably from 30 to 70 mass %, and most preferably from 40 to 70 mass %. Preferred examples of the fluorine-based compound include, but are not limited to, R-2020, M-2020, R-3833, M-3833 and OPTOOL DAC (all trade names) produced by Daikin Industries, Ltd.; and Megaface F-171, F-172, F-179A, DYFENSA MCF-300 and MCF-323 (all trade names) produced by Dai-Nippon Ink & Chemicals, Inc.

The polysiloxane fluorine-based compound or the compound having a polysiloxane structure is preferably added in the range from 0.1 to 10 mass %, more preferably from 1 to 5 mass %, based on the entire solid content of the low refractive index layer.

<High Refractive Index Layer, Intermediate Refractive Index Layer>

In the optical film of the present invention, when a high refractive index layer is provided between the transparent support of the antiglare layer and the low refractive index layer on the opposite side and optical interference is utilized in cooperation with the low refractive index layer, the antireflection property can be enhanced. Furthermore, an intermediate refractive index layer having a refractive index intermediate between the antiglare layer and the high refractive index layer is preferably provided between the antiglare layer and the high refractive index layer.

In the following context of the present invention, these high and intermediate refractive index layers are sometimes collectively referred to as a high refractive index layer. Incidentally, in the present invention, the "high", "intermediate" and "low" in the high refractive index layer, intermediate refractive index layer and low refractive index layer indicate the relative size of refractive index among layers. In terms of the relationship with the antiglare layer, the refractive index preferably satisfies the relationships of antiglare layer>low refractive index layer, and high refractive index layer>antiglare layer.

Also, in the context of the present invention, the high refractive layer, intermediate refractive layer and low refractive index layer are sometimes collectively referred to as an antireflection layer.

In the case of an antireflection film having a low refractive index layer on a high refractive index layer, the refractive index of the high refractive index layer is preferably from 1.55 to 2.40, more preferably from 1.60 to 2.20, still more preferably from 1.60 to 2.00.

In the case of an antireflection film having an intermediate refractive index layer, a high refractive index layer and a low refractive index layer in this order from the transparent support side, the refractive index of the high refractive index layer is preferably from 1.65 to 2.40, more preferably from 1.70 to 2.20. The refractive index of the intermediate refractive index layer is adjusted to a value intermediate between the refractive index of the low refractive index layer and the refractive index of the high refractive index layer. The refractive index of the intermediate refractive index layer is preferably from 1.55 to 1.80, more preferably from 1.55 to 1.70.

As for specific examples of the inorganic particle used in the high and intermediate refractive index layers, an inorganic particle comprising an inorganic oxide such as $TiO_2$, $ZrO_2$, $Al_2O_3$, $In_2O_3$, $ZnO$, $SnO_2$, $Sb_2O_3$ or ITO as the main component is preferred, and an inorganic particle comprising $SiO_2$ as the main component may also be added for adjusting the refractive index. In particular, from the standpoint of obtaining a high refractive index, the inorganic particle used in the high refractive index layer is preferably $TiO_2$ or $ZrO_2$. It is also preferred that the surface of the inorganic filler is subjected to a silane coupling treatment or a titanium coupling treatment. A surface-treating agent having a functional group capable of reacting with the binder species on the filler surface is preferably used.

The content of the inorganic particle in the high refractive index layer is preferably from 10 to 90 mass %, more preferably from 15 to 80 mass %, still more preferably from 15 to 75 mass %, based on the mass of the high refractive index layer. Two or more kinds of inorganic particles may be used in combination in the high refractive index layer.

In the case of having a low refractive index layer on a high refractive index layer, the refractive index of the high refractive index layer is preferably higher than the refractive index of the transparent support.

<Antistatic Layer>

In the present invention, at least one layer of the thin film layers constituting the antireflective film may be formed as an antistatic layer. In particular, when a fluorine-containing antifouling agent is used, excellent antifouling property with a low refractive index can be brought out, but fluorine is oriented in the surface layer of the coating film and this tends to incur bad antistatic property and poor dust resistance. Therefore, in the present invention, an antistatic layer is preferably provided in view of electrostatic protection on the film surface.

The materials used in the antistatic layer and the performance of the antistatic layer are described in detail below.

Examples of the method for forming the antistatic layer include conventionally known methods such as a method of coating an electrically conductive coating solution containing an electrically conductive fine particle and a reactive curable resin, a method of coating a transparent electrically conductive material composed of a transparent polymer having electrical conductivity, and a method of vapor-depositing or sputtering a transparent film-forming metal or metal oxide or the like to form an electrically conductive thin film. The antistatic layer may be formed on the transparent support directly or through a primer layer ensuring firm adhesion to the transparent support. In the case of providing the antistatic layer as a layer closer to the outermost surface layer of the antireflection film, sufficient antistatic property can be obtained even with a small layer thickness and this is preferred. In the present invention, at least one of thin film layers or a layer positioned between the transparent support and a thin film layer closest to the transparent support out of the thin film layers is preferably used as the antistatic layer. The coating method is not particularly limited, and the coating may be performed by selecting an optimal method from known methods such as roll coating, gravure coating, bar coating and extrusion coating, according to the properties or coated amount of the coating solution.

The surface resistance of the antistatic layer preferably has a resistance value (SR) satisfying the following formula (4):

$$\text{Log SR} \leq 12 \qquad \text{Formula (4):}$$

In formula (4), Log SR is preferably from 5 to 12, more preferably from 5 to 9, and most preferably from 5 to 8. The surface resistance (SR) of the antistatic layer can be measured by a four-probe method or a circular electrode method.

The antistatic layer is preferably substantially transparent. Specifically, the haze of the antistatic layer is preferably 10% or less, more preferably 5% or less, still more preferably 3% or less, and most preferably 1% or less. Furthermore, the transmittance for light at a wavelength of 550 nm is preferably 50% or more, more preferably 60% or more, still more preferably 65% or more, and most preferably 70% or more.

2. Electrically Conductive Inorganic Fine Particle of Antistatic Layer

The antistatic layer may be formed using a coating composition obtained by dissolving an electrically conductive fine particle and a reactive curable resin in a solvent. In this case, the electrically conductive inorganic fine particle is preferably formed of a metal oxide or nitride. Examples of the metal oxide or nitride include tin oxide, indium oxide, zinc oxide and titanium nitride. Among these, tin oxide and indium oxide are preferred. The electrically conductive inorganic fine particle comprises such a metal oxide or nitride as the main component and may further contain other elements. The main component means a component having a largest content (mass %) out of the components constituting the particle. Examples of the other element include Ti, Zr, Sn, Sb, Cu, Fe, Mn, Pb, Cd, As, Cr, Hg, Zn, Al, Mg, Si, P, S, B, Nb, In, V and a halogen atom. In order to raise the electrical conductivity of tin oxide or indium oxide, at least one element selected from Sb, P, B, Nb, In, V and a halogen atom is preferably added. More specifically, one metal oxide or a combination of two or more oxides selected from the group consisting of tin-doped indium oxide (ITO), antimony-doped tin oxide (ATO), fluorine-doped tin oxide (FTO), a phosphorus-doped tin oxide (PTO), antimony zinc oxide (AZO), indium-doped zinc oxide (IZO), zinc oxide, ruthenium oxide, rhenium oxide, silver oxide, nickel oxide and copper oxide may be used. Above all, tin-doped indium oxide (ITO), antimony-doped tin oxide (ATO) and phosphorus-doped tin oxide (PTO) are preferred. The proportion of Sb in ATO is preferably from 3 to 20 mass %, and the proportion of In in ITO is preferably from 5 to 20 mass %.

The average primary particle diameter of the electrically conductive inorganic fine particle for use in the antistatic layer is preferably from 1 to 150 nm, more preferably from 5 to 100 nm, and most preferably from 5 to 70 nm. The average particle diameter of the electrically conductive inorganic fine particle in the antistatic layer formed is from 1 to 200 nm, preferably from 5 to 150 nm, more preferably from 10 to 100 nm, and most preferably from 10 to 80 nm. The average particle diameter of the electrically conductive inorganic fine particle is an average diameter weighted with the mass of particle and can be measured using a light-scattering method or an electron micrograph.

The electrically conductive inorganic fine particle may be surface-treated. The surface treatment is performed using an inorganic compound or an organic compound. Examples of the inorganic compound used for the surface treatment include alumina and silica. A silica treatment is preferred. Examples of the organic compound used for the surface treatment include a polyol, an alkanolamine, a stearic acid, a silane coupling agent and a titanate coupling agent, with a silane coupling agent being most preferred. Specifically, the method described above in {Surface Treating Method of Inorganic Fine Particle} for the inorganic fine particle as the constituent component (C) of the present invention may be suitably used. The methods described in paragraphs [0101] to [0122] of JP-A-2008-31327 may also be preferably used. Two or more kinds of surface treatments may be performed in combination.

The shape of the electrically conductive inorganic fine particle is preferably rice grain-like, spherical, cubic, spindle-like or amorphous.

Two or more kinds of electrically conductive inorganic fine particles may be used in combination in the antistatic layer.

The proportion of the electrically conductive inorganic fine particle in the antistatic layer is preferably from 20 to 90 mass %, more preferably from 25 to 85 mass %, still more preferably from 30 to 80 mass %, based on the entire solid content.

The electrically conductive inorganic fine particle is used in a dispersion state for the formation of the antistatic layer. The dispersion medium used for the electrically conductive inorganic fine particle is preferably a liquid having a boiling point of 60 to 170° C. Examples of the dispersion medium include water, an alcohol (e.g., methanol, ethanol, isopropanol, butanol, benzyl alcohol), a ketone (e.g., acetone, methyl ethyl ketone, methyl isobutyl ketone, cyclohexanone), an ester (e.g., methyl acetate, ethyl acetate, propyl acetate, butyl acetate, methyl formate, ethyl formate, propyl formate, butyl formate), an aliphatic hydrocarbon (e.g., hexane, cyclohexane), a halogenated hydrocarbon (e.g., methylene chloride, chloroform, carbon tetrachloride), an aromatic hydrocarbon (e.g., benzene, toluene, xylene), an amide (e.g., dimethylformamide, dimethylacetamide, n-methylpyrrolidone), an ether (e.g., diethyl ether, dioxane, tetrahydrofuran) and an ether alcohol (e.g., 1-methoxy-2-propanol). Among these, preferred are toluene, xylene, methyl ethyl ketone, methyl isobutyl ketone, cyclohexanone and butanol. The electrically conductive inorganic fine particle can be dispersed in the medium by using a disperser. Examples of the disperser include a sand grinder mill (e.g., bead mill with pin), a high-speed impeller mill, a pebble mill, a roller mill, an attritor and a colloid mill. Among these, a sand grinder mill and a high-speed impeller mill are preferred. Also, a preliminary dispersion treatment may be performed. Examples of the disperser for use in the preliminary dispersion treatment include a ball mill, a three-roll mill, a kneader and an extruder.

The electrically conductive inorganic compound particle is preferably reacted with an alkoxysilane compound in an organic solvent. When a reaction solution obtained by previously reacting the electrically conductive inorganic compound particle and an alkoxysilane compound is used, this provides an effect of ensuring excellent storage stability and excellent curability Examples of the commercially available product for the powdered electrically conductive inorganic oxide particle include T-1 (trade name) (ITO) produced by Mitsubishi Materials Corporation), PASSTRAN (trade name) (ITO, ATO) produced by Mitsui Mining & Smelting Co., Ltd., SN-100P (trade name) (ATO) produced by Ishihara Sangyo Kaisha, Ltd., NanoTek ITO (trade name) produced by C.I. Kasei Co., Ltd., and ATO and FTO (trade names) produced by Nissan Chemical Industries, Ltd.

The electrically conductive inorganic oxide particle is preferably a particle carrying silicon oxide on the surface thereof because of effective reaction with the alkoxysilane compound. The method for allowing silicon oxide to be carried is disclosed, for example, in Japanese Patent 2858271, and such a particle can be produced by a process of producing a coprecipitation product of tin oxide and antimony oxide hydrate, depositing a silicon compound thereon, and classifying and sintering the product.

Examples of the commercially available product for the electrically conductive inorganic oxide particle carrying silicon oxide on the surface thereof include SN-100P (ATO), SNS-10M and FSS-10M (all trade names, produced by Ishihara Sangyo Kaisha, Ltd.).

Examples of the commercially available product for the electrically conductive inorganic oxide particle dispersed in an organic solvent include SNS-10M (antimony-doped tin oxide dispersed in MEK) and FSS-10M (antimony-doped tin oxide dispersed in isopropyl alcohol), both trade names, produced by Ishihara Sangyo Kaisha, Ltd.; Celnax CX-Z401 M (zinc antimonate dispersed in methanol) and Celnax CX-Z200IP (zinc antimonate dispersed in isopropyl alcohol), both trade names, produced by Nissan Chemical Industries, Ltd.); and ELCOM JX-1001PTV (phosphorus-containing tin oxide dispersed in propylene glycol monomethyl ether), trade name, produced by Catalysts & Chemicals Ind. Co., Ltd.

<Organic Solvent of Antistatic Layer>

As described above, the organic solvent used in the curable composition for the formation of antistatic layer is used as a dispersion medium in which the electrically conductive inorganic oxide particle is dispersed.

The blending amount of the organic solvent is preferably from 20 to 4,000 parts by mass, more preferably from 100 to 1,000 parts by mass, per 100 parts by mass of the electrically conductive inorganic oxide particle. If the amount of the solvent is less than 20 parts by mass, the reaction is difficult to proceed uniformly due to high viscosity, whereas if it exceeds 4,000 parts by mass, the coatability may decrease.

Examples of such an organic solvent include a solvent having a boiling point of 200° C. or less under ordinary pressure. Specific examples of the organic solvent used here include alcohols, ketones, ethers, esters, hydrocarbons and amides. One of these organic solvents may be used alone, or two or more thereof may be used in combination. Above all, alcohols, ketones, ethers and esters are preferred.

Examples of the alcohols include methanol, ethanol, isopropyl alcohol, isobutanol, n-butanol, tert-butanol, ethoxy ethanol, butoxy ethanol, diethylene glycol monoethyl ether, benzyl alcohol and phenethyl alcohol. Examples of the ketones include acetone, methyl ethyl ketone, methyl diisobutyl ketone and cyclohexanone. Examples of the esters include ethyl acetate, butyl acetate and ethyl lactate. Examples of the hydrocarbons include toluene and xylene. Examples of the amides include formamide, dimethylacetamide and N-methylpyrrolidone.

Above all, isopropyl alcohol, ethoxy ethanol, butoxy ethanol, diethylene glycol monoethyl ether, propylene glycol monoethyl ether, methyl ethyl ketone, methyl isobutyl ketone, cyclohexanone, propylene glycol monoethyl ether acetate, butyl acetate and ethyl lactate are preferred.

<Binder of Antistatic Layer>

As for the binder of the antistatic layer, a curable resin used in the high refractive index layer, particularly, an ionizing radiation-curable polyfunctional monomer or polyfunctional oligomer, is preferably used. A crosslinked polymer obtained by reacting a reactive curable resin may also be used as the binder. The crosslinked polymer preferably has an anionic group.

The crosslinked polymer having an anionic group has a structure where the main chain of the polymer having an anionic group is crosslinked. The anionic group has a function of maintaining the dispersed state of the electrically conductive inorganic fine particle, and the crosslinked structure has a function of imparting a film-forming ability to the polymer and strengthening the antistatic layer.

Examples of the polymer main chain include polyolefin (saturated hydrocarbon), polyether, polyurea, polyurethane, polyester, polyamine, polyamide and melamine resins. A polyolefin main chain, a polyether main chain and a polyurea main chain are preferred, a polyolefin main chain and a polyether main chain are more preferred, and a polyolefin main chain is most preferred.

The polyolefin main chain comprises a saturated hydrocarbon. The polyolefin main chain is obtained, for example, by the addition polymerization reaction of an unsaturated polymerizable group. In the polyether main chain, repeating units are connected through an ether bond (—O—). The polyether main chain is obtained, for example, by the ring-opening polymerization reaction of an epoxy group. In the polyurea main chain, repeating units are connected through a urea bond (—NH—CO—NH—). The polyurea main chain is obtained, for example, by the condensation polymerization reaction of an isocyanate group and an amino group. In the polyurethane main chain, repeating units are connected through a urethane bond (—NH—CO—O—). The polyurethane main chain is obtained, for example, by the condensation polymerization reaction of an isocyanate group and a hydroxyl group (including an N-methylol group). In the polyester main chain, repeating units are connected through an ester bond (—CO—O—). The polyester main chain is obtained, for example, by the condensation polymerization reaction of a carboxyl group (including an acid halide group) and a hydroxyl group (including an N-methylol group). In the polyamine main chain, repeating units are connected through an imino bond (—NH—). The polyamine main chain is obtained, for example, by the ring-opening polymerization reaction of an ethyleneimine group. In the polyamide main chain, repeating units are connected through an amido bond (—NH—CO—). The polyamide main chain is obtained, for example, by the reaction of an isocyanate group and a carboxyl group (including an acid halide group). The melamine resin main chain is obtained, for example, by the condensation polymerization reaction of a triazine group (e.g., melamine) and an aldehyde (e.g., formaldehyde). Incidentally, in the melamine resin, the main chain itself has a crosslinked structure.

The anionic group is bonded directly to the polymer main chain or bonded to the main chain through a linking group. The anionic group is preferably bonded as a side chain to the main chain through a linking group.

Examples of the anionic group include a carboxylic acid group (carboxyl), a sulfonic acid group (sulfo) and a phosphoric acid group (phosphono), and a sulfonic acid group and a phosphoric acid group are preferred.

The anionic group may be in a salt sate. The cation forming the salt with the anionic group is preferably an alkali metal ion. Also, the proton of the anionic group may be dissociated.

The linking group connecting the anionic group and the polymer main chain is preferably a divalent group selected from —CO—, —O—, an alkylene group, an arylene group and a combination thereof.

The crosslinked structure forms chemical bonding (preferably covalent bonding) of two or more main chains. The crosslinked structure preferably forms covalent bonding of three or more main chains. The crosslinked structure is preferably composed of a divalent or greater group selected from —CO—, —O—, —S—, a nitrogen atom, a phosphorus atom, an aliphatic residue, an aromatic residue and a combination thereof.

The crosslinked polymer having an anionic group is preferably a copolymer containing a repeating unit having an anionic group and a repeating unit having a crosslinked structure. In the copolymer, the proportion of the repeating unit having an anionic group is preferably from 2 to 96 mass %, more preferably from 4 to 94 mass %, and most preferably from 6 to 92 mass %. The repeating unit may have two or more anionic groups. In the copolymer, the proportion of the repeating unit having a crosslinked structure is preferably from 4 to 98 mass %, more preferably from 6 to 96 mass %, and most preferably from 8 to 94 mass %.

The repeating unit of the crosslinked polymer having an anionic group may have both an anionic group and a crosslinked structure. Also, other repeating units (a repeating unit having neither an anionic group nor a crosslinked unit) may be contained.

Other repeating units are preferably a repeating unit having an amino group or a quaternary ammonium group and a repeating unit having a benzene ring. The amino group or quaternary ammonium group has a function of, similarly to the anionic group, maintaining the dispersed state of the inorganic fine particle. Incidentally, the same effects can be obtained when the amino group, quaternary ammonium group or benzene ring is contained even in the repeating unit having an anion group or in the repeating unit having a crosslinked structure.

In the repeating unit having an amino group or a quaternary ammonium group, the amino group or quaternary ammonium group is bonded directly to the polymer main chain or bonded to the main chain through a linking group. The amino group or quaternary ammonium group is preferably bonded as a side chain to the main chain through a linking group. The amino group or quaternary ammonium group is preferably a secondary amino group, a tertiary amino group or a quaternary ammonium group, more preferably a tertiary amino group or a quaternary ammonium group. The group bonded to the nitrogen atom of the secondary or tertiary amino group or quaternary ammonium group is preferably an alkyl group, more preferably an alkyl group having a carbon atom number of 1 to 12, still more preferably an alkyl group having a carbon atom number of 1 to 6. The counter ion of the quaternary ammonium group is preferably a halide ion. The linking group connecting the amino group or quaternary ammonium group and the polymer main chain is preferably a divalent group selected from —CO—, —NH—, —O—, an alkylene group, an arylene group and a combination thereof. In the case where the crosslinked polymer having an anionic group contains a repeating unit having an amino group or a quaternary ammonium group, the proportion of the repeating unit is preferably from 0.06 to 32 mass %, more preferably from 0.08 to 30 mass %, and most preferably from 0.1 to 28 mass %.

The above-described binder may also be used in combination with a reactive organosilicon compound described, for example, in JP-A-2003-39586. The reactive organosilicon compound is used in the range from 10 to 70 mass % based on the ionizing radiation-curable resin as the binder above. The reactive organosilicon compound is preferably an organosilane compound, and the antistatic layer can be formed by using only this compound as the resin component.

<Solvent>

The solvent in which the coating composition for forming a layer other than the antistatic layer is dissolved is not particularly limited, but an alcohol-based solvent or a ketone-based solvent is preferably used. Specific examples thereof include acetone, methyl ethyl ketone, 2-pentanone, 3-pentanone, 2-hexane, 2-heptanone, 4-heptanone, methyl isopropyl ketone, ethyl isopropyl ketone, diisopropyl ketone, methyl isobutyl ketone, methyl-tert-butyl ketone, diacetyl, acetylacetone, acetonylacetone, diacetone alcohol, mesityl oxide, chloroacetone, cyclopentanone, cyclohexanone and acetophenone. Among these, methyl ethyl ketone and methyl isobutyl ketone are preferred. One of these solvents may be used alone, or several kinds thereof may be mixed and used in an arbitrary mixing ratio.

Also, an ester-based solvent such as propylene glycol monomethyl ether acetate, or a fluorine-based solvent (e.g., fluorine-based alcohol) may be appropriately used as an auxiliary solvent. One of these solvents may be used alone, or several kinds thereof may be mixed and used in an arbitrary mixing ratio.

In the present invention, the antireflection film in which a low refractive index layer and the like are provided preferably has an integrated reflectance of 3.0% or less, more preferably 2.0% or less, and most preferably from 1.5 to 0.3%. By decreasing the integrated reflectance, sufficient antiglare property is obtained even when the light scattering on the antiglare film surface is reduced, so that an antiglare antireflection film excellent in the denseness of black can be obtained.

<Transparent Support>

The transparent support for use in the antiglare film of the present invention is preferably a plastic film. Examples of the polymer forming the plastic film include a cellulose acylate (e.g., triacetyl cellulose, diacetyl cellulose; representatively, TAC-TD80U, TD80UF and the like produced by Fujifilm Corp.), a polyamide, a polycarbonate, a polyester (e.g., polyethylene terephthalate, polyethylene naphthalate), a polystyrene, a polyolefin, a norbornene-based resin (ARTON, trade name, produced by JSR Corp.), an amorphous polyolefin (ZEONEX, trade name, produced by Zeon Corp.), and a (meth)acrylic resin (ACRYPET VRL20A, trade name, produced by Mitsubishi Rayon Co., Ltd., and ring structure-containing acrylic resins described in JP-A-2004-70296 and JP-A-2006-171464). Among these, triacetyl cellulose, polyethylene terephthalate and polyethylene naphthalate are preferred, and triacetyl cellulose is more preferred.

In the case of using the antiglare film of the present invention for a liquid crystal display device, the antiglare film is disposed on the outermost surface of the display, for example, by providing an adhesive layer on one surface. The antiglare film of the present invention may be combined with a polarizing plate. In the case where the transparent support is triacetyl cellulose, since triacetyl cellulose is used as a protective film for protecting the polarizing layer of the polarizing plate, it is preferred in view of the cost to directly use the antiglare film of the present invention as a protective film.

In the case where the antiglare film of the present invention is disposed on the outermost surface of the display, for example, by providing an adhesive layer on one surface or is directly used as a polarizing plate protective film, after forming the outermost layer on the transparent substrate, a saponification treatment is preferably performed for ensuring sufficient adhesion. The saponification treatment is performed by a known method, for example, by dipping the film in an alkali solution for an appropriate time. After the dipping in an alkali solution, the film is preferably thoroughly washed with water or dipped in a dilute acid to neutralize alkali components so as not to allow alkali components to remain in the film.

The surface of the transparent support on the side opposite the surface having the outermost layer is made hydrophilic by the saponification treatment.

<Coating Method>

The antiglare film of the present invention can be formed by the following method, but the present invention is not limited to this method. First, a coating solution containing components for forming each layer is prepared. Next, the coating solution for forming various functional layers is coated on a transparent support by a dip coating method, an air knife coating method, a curtain coating method, a roller coating method, a wire bar coating method, a gravure coating method or a die coating method and then heated/dried. A microgravure coating method, a wire bar coating method and a die coating method (see, U.S. Pat. No. 2,681,294 and JP-A-2006-122889) are preferred, and a die coating method is more preferred.

Thereafter, the monomers for forming the functional layer are polymerized and cured by irradiation of light such as ionizing radiation or under heating, preferably by irradiation of ionizing radiation under heating, whereby the functional layer is formed. Here, a plurality of functional layers may be provided, if desired.

Thereafter, the coating solution for forming a low refractive index layer is coated on the functional layer and irradiated with light or heated in the same manner (that is, cured by irradiating ionizing radiation such as ultraviolet ray, preferably by irradiating ionizing radiation under heating) to form a low refractive index layer. In this way, the antiglare film of the present invention, in which a low refractive index layer is stacked, is obtained.

<Polarizing Plate>

The polarizing plate is mainly composed of two protective films for protecting both surfaces on the front and back sides of a polarizing film. The antiglare film of the present invention is preferably used for at least one of those two protective films sandwiching the polarizing film from both surfaces. By using the antiglare film of the present invention to serve also as a protective film, the production cost of the polarizing plate can be reduced. Furthermore, by using the antiglare film of the present invention as the outermost layer, disturbing reflection or the like of outside light can be prevented and a polarizing plate excellent also in the scratch resistance, antifouling property and the like can be obtained.

The hydrophilized surface is effective particularly in improving the adhesion to a polarizing film comprising polyvinyl alcohol as the main component. Also, the hydrophilized surface hardly allows attachment of dusts in the air and therefore, dusts scarcely intrude between the polarizing film and the antiglare film when adhering the antiglare film to the polarizing film, which is effective in preventing point defects due to dusts.

The saponification treatment is preferably performed such that the contact angle for water of the transparent substrate surface opposite the surface having the outermost layer becomes 40° or less, more preferably 30° or less, still more preferably 20° or less.

<Image Display Device>

The antiglare film of the present invention can be applied to an image display device such as liquid crystal display (LCD), plasma display panel (PDP), electroluminescent display (ELD), cathode ray tube display (CRT) and surface-conduction electron-emitter display (SED) In particular, the antiglare film is preferably used for a liquid crystal display (LCD). The antiglare film of the present invention has a transparent support and therefore, is used by adhering the transparent support side to the image display surface of the image display device.

In the case of using the antiglare film of the present invention as one surface protective film of a polarizing film, the antiglare film can be preferably used for a transmissive, reflective or transflective liquid crystal display device in a mode such as twisted nematic (TN), super twisted nematic (STN), vertical alignment (VA), in-plane switching (IPS) and optically compensated bend cell (OCB).

EXAMPLES

The present invention is described in greater detail below by referring to Examples, but the present invention is not limited thereto. Incidentally, unless otherwise indicated, the "parts" and "%" are on the mass basis.

Formulation of Coating Solution A-1 for Antiglare Layer:

| | |
|---|---|
| PET-30 | 65.0 g |
| IRGACURE 127 | 3.0 g |
| 8 µm Crosslinked acryl particle (30%) | 20.0 g |
| 8 µm Crosslinked acryl/styrene particle (30%) | 52.6 g |
| SP-13 | 0.2 g |
| CAB | 0.5 g |
| MIBK | 72.6 g |
| MEK | 32.5 g |

Formulation of Coating Solution A-2 for Antiglare Layer:

| | |
|---|---|
| PET-30 | 65.0 g |
| IRGACURE 127 | 3.0 g |
| 8 µm Crosslinked acryl particle (30%) | 69.0 g |
| 12 µm Crosslinked acryl/styrene particle (30%) | 3.6 g |
| SP-13 | 0.2 g |
| CAB | 0.5 g |
| MIBK | 72.6 g |
| MEK | 32.5 g |

Formulation of Coating Solution A-3 for Antiglare Layer:

| | |
|---|---|
| PET-30 | 31.0 g |
| IRGACURE 127 | 1.5 g |
| KBM-5103 | 6.2 g |
| 3.5 µm Crosslinked styrene particle (30%) | 13.0 g |
| 3.5 µm Crosslinked acryl/styrene particle (30%) | 13.0 g |
| SP-13 | 0.04 g |
| MIBK | 31.0 g |

Formulation of Coating Solution A-4 for Antiglare Layer:

| | |
|---|---|
| DPHA | 14.8 g |
| PET-30 | 19.6 g |
| GRANDIC PC7-3201F | 17.8 g |
| EB1290K | 30.2 g |
| IRGACURE 127 | 3.0 g |
| 8 μm Crosslinked acryl/styrene particle (30%) | 48.3 g |
| SP-13 | 0.1 g |
| Butyl acetate | 21.2 g |
| Ethyl acetate | 45.0 g |

Formulation of Coating Solution A-8 for Antiglare Layer:

| | |
|---|---|
| DPHA | 14.8 g |
| PET-30 | 19.6 g |
| GRANDIC PC7-3201F | 17.8 g |
| EB1290K | 30.2 g |
| IRGACURE 127 | 3.0 g |
| 7 μm Crosslinked acryl/styrene particle (30%) | 35.3 g |
| 7 μm Crosslinked styrene particle (30%) | 13.0 g |
| SP-13 | 0.1 g |
| Butyl acetate | 21.2 g |
| Ethyl acetate | 45.0 g |

These coating solutions for antiglare layer each was filtered through a polypropylene-made filter having a pore size of 30 μm to prepare a coating solution. In all of the coating solutions above, the refractive index of the matrix after curing was 1.525.

The refractive index of the matrix after curing was measured as follows.

A 80 μm-thick triacetyl cellulose film (TAC-TD80U, produced by Fujifilm Corp.) in a roll form was unrolled, and a coating solution for antiglare layer, from which the light-transmitting particle such as 8 μm crosslinked acryl particle was removed, was coated thereon by the die coating method using a slot die disclosed in Example 1 in JP-A-2006-122889 under the condition of a conveying speed of 30 m/min by adjusting the coated amount to give a film thickness of 10 μm. After drying at 60° C. for 150 seconds, the coated layer was cured by irradiating an ultraviolet ray thereon at an illuminance of 400 mW/cm$^2$ and an irradiation dose of 300 mJ/cm$^2$ with use of an air-cooled metal halide lamp (manufactured by Eye Graphics Co., Ltd.) of 160 W/cm under nitrogen purging to an oxygen concentration of about 0.1%, and the refractive index of this coated layer was measured. The refractive index of the coated layer was measured directly by an Abbe refractometer.

The refractive index of the core particle of the light-transmitting particle was determined as follows. The light-transmitting particles were dispersed in equal amounts in solvents prepared by changing the mixing ratio of arbitrary two kinds of solvents different in the refractive index selected from methylene iodide, 1,2-dibromopropane and n-hexane and thereby varying the refractive index, the turbidity was measured, and the refractive index of the solvent when the turbidity became minimum was measured by an Abbe refractometer.

As for the shell layer, a particle was formed using the materials constituting the shell layer and the refractive index thereof was measured by the same method as in the measurement of the refractive index of the core particle.

Formulation of Coating Solution H-1 for Surface Conditioning Layer

| | |
|---|---|
| PET-30 | 86.8 g |
| IRGACURE 127 | 3.0 g |
| CAB | 0.5 g |
| MIBK | 123.4 g |
| MEK | 32.5 g |

The coating solution for surface conditioning layer was prepared by filtering the coating solution above through a polypropylene-made filter having a pore size of 1 μm. The refractive index after curing of the surface conditioning layer formed by coating and curing the coating solution was 1.525. The refractive index of the surface conditioning layer was measured in the same manner as that of the coating solution for antiglare layer.

Formulation of Coating Solution L-1 for Low Refractive Index Layer

| | |
|---|---|
| Fluorine-containing polymer containing an ethylenically unsaturated group (A-1) | 3.9 g |
| Silica Liquid Dispersion A (22%) | 25.0 g |
| IRGACURE 127 | 0.2 g |
| DPHA | 0.4 g |
| MEK | 100.0 g |
| MIBK | 45.5 g |

The coating solution for low refractive index layer was prepared by filtering the coating solution above through a polypropylene-made filter having a pore size of 1 μm. The refractive index after curing of the low refractive index layer formed by coating and curing the coating solution was 1.360.

The compounds used are as follows.

PET-30:

A mixture of pentaerythritol triacrylate and pentaerythritol tetraacrylate [produced by Nippon Kayaku Co., Ltd.].

DPHA:

A mixture of dipentaerythritol pentaacrylate and dipentaerythritol hexaacrylate [produced by Nippon Kayaku Co., Ltd.]

KBM-5103:

An organosilane compound [produced by Shin-Etsu Chemical Co., Ltd.]

GRANDIC PC7-3201F:

A hydroxyl group-containing acrylate monomer [produced by DIC Corp.]

EB1290K:

A urethane acrylate monomer [produced by DAICEL-CYTEC Company Ltd.]

8 μm Crosslinked Acryl Particle (30%):

A dispersion in MIBK, obtained by dispersing crosslinked acryl particles having an average particle diameter of 8.0 μm [produced by Soken Chemical & Engineering Co.] by a polytron disperser at 10,000 rpm for 20 minutes.

8 μm Crosslinked Acryl/Styrene Particle (30%):

A dispersion in MIBK, obtained by dispersing crosslinked acryl/styrene particles having an average particle diameter of 8.0 μm (refractive index of core particle: 1.555, refractive index of shell layer: 1.500, composition of shell layer: crosslinked polymethyl methacrylate, thickness of shell layer: 100 nm) by a polytron disperser at 10,000 rpm for 20 minutes.

12 μm Crosslinked Acryl/Styrene Particle (30%):

A dispersion in MIBK, obtained by dispersing crosslinked acryl/styrene particles having an average particle diameter of 12.0 μm (refractive index of core particle: 1.570, refractive index of shell layer: 1.500, composition of shell layer: crosslinked polymethyl methacrylate, thickness of shell layer: 1,000 nm) by a polytron disperser at 10,000 rpm for 20 minutes.

3.5 μm Crosslinked Styrene Particle (30%):

A dispersion in cyclohexanone, obtained by dispersing crosslinked styrene particles having an average particle diameter of 3.5 μm (refractive index of core particle: 1.60, refractive index of shell layer: 1.530, composition of shell layer: crosslinked acryl/styrene, thickness of shell layer: 200 nm) by a polytron disperser at 10,000 rpm for 20 minutes.

3.5 μm Crosslinked Styrene Particle (30%):

A dispersion in cyclohexanone, obtained by dispersing crosslinked acryl/styrene particles having an average particle diameter of 3.5 μm (refractive index of core particle: 1.550, refractive index of shell layer: 1.500, composition of shell layer: crosslinked polymethyl methacrylate, thickness of shell layer: 50 nm) by a polytron disperser at 10,000 rpm for 20 minutes.

7 μm Crosslinked Acryl/Styrene Particle (30%):

A dispersion in MIBK, obtained by dispersing crosslinked acryl/styrene particles having an average particle diameter of 7.0 μm (refractive index of core particle: 1.545, refractive index of shell layer: 1.500, composition of shell layer: crosslinked polymethyl methacrylate, thickness of shell layer: 80 nm) by a polytron disperser at 10,000 rpm for 20 minutes.

7 μm Crosslinked Styrene Particle (30%):

A dispersion in cyclohexanone, obtained by dispersing crosslinked styrene particles having an average particle diameter of 7 μm (refractive index of core particle: 1.60, refractive index of shell layer: 1.500, composition of shell layer: crosslinked polymethyl methacrylate, thickness of shell layer: 90 nm) by a polytron disperser at 10,000 rpm for 20 minutes.

IRGACURE 127:

A photopolymerization initiator [produced by Ciba Specialty Chemicals Corp.]

CAB:

Cellulose acetate butyrate [produced by Eastman Chemical, CAB-531-1

Fluorine-Containing Polymer Containing an Ethylenically Unsaturated Group (A-1):

Fluoropolymer (A-1) described in Production Example 3 of JP-A-2005-89536

SP-13:

A fluorine-containing surfactant (used after dissolving as a 10 mass % solution in MEK)

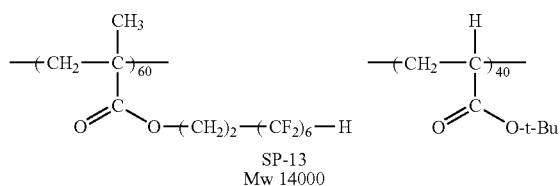

SP-13
Mw 14000

(Silica Liquid Dispersion A)

After adding and mixing 10 g of acryloyloxypropyltrimethoxysilane (produced by Shin-Etsu Chemical Co., Ltd.) and 1.0 g of diisopropoxyaluminum ethyl acetate to 500 g of a hollow silica fine particle sol (isopropyl alcohol silica sol, average particle diameter: 60 nm, thickness of shell: 10 nm, silica concentration: 20 mass %, refractive index of silica particle: 1.31, prepared according to Preparation Example 4 of JP-A-2002-79616 by changing the particle size), 3 g of ion-exchanged water was added thereto. Subsequent to the reaction at 60° C. for 8 hours, the reaction solution was cooled to room temperature and 1.0 g of acetyl acetone was added thereto. While adding cyclohexanone to 500 g of the resulting liquid dispersion to keep almost constant the silica content, solvent replacement by reduced-pressure distillation was performed. Extraneous substances were not generated in the liquid dispersion and when the solid content concentration was adjusted to 22 mass % with cyclohexanone, the viscosity was 5 mPa·s at 25° C. The amount of isopropyl alcohol remaining in the obtained Liquid Dispersion A was analyzed by gas chromatography and found to be 1.0%.

[Preparation of Coating Solutions for Antiglare Layer (A-5) to (A-7), (A-9) and (A-10)]

Coating Solution for Antiglare Layer (A-5) was prepared by changing the 8 μm crosslinked acryl/styrene particle to a particle with a single refractive index not having a core particle/shell layer structure (average particle diameter 8.0 μm, refractive index: 1.555) in the preparation of Coating Solution for Antiglare Layer (A-1). Coating Solution for Antiglare Layer (A-6) was prepared by changing the shell layer thickness of the 3.5 μm crosslinked styrene particle to 8 nm and changing the shell layer thickness of the 3.5 μm crosslinked acryl/styrene particle to 8 nm in the preparation of Coating Solution for Antiglare Layer (A-3). Coating Solution for Antiglare Layer (A-7) was prepared by changing the shell layer thickness of the 8 μm crosslinked acryl/styrene particle to 2,500 nm in the preparation of Coating Solution for Antiglare Layer (A-4).

Coating Solution for Antiglare Layer (A-9) was prepared by changing the shell layer thickness of the 8 μm crosslinked acryl/styrene particle to 12 nm in the preparation of Coating Solution for Antiglare Layer (A-1). Coating Solution for Antiglare Layer (A-10) was prepared by changing the shell layer thickness of the 8 μm crosslinked acryl/styrene particle to 50 nm in the preparation of Coating Solution for Antiglare Layer (A-4).

Example 1

Production of Optical Film Samples 101 to 111

(1) Coating of Antiglare Layer

A 80 μm-thick triacetyl cellulose film (TAC-TD80U, produced by Fujifilm Corp.) in a roll form was unrolled, and a coating solution for antiglare layer shown in Table 1 was coated thereon by the die coating method using a slot die disclosed in Example 1 in JP-A-2006-122889 under the condition of a conveying speed of 30 m/min. After drying at 60° C. for 150 seconds, the coated layer was cured by irradiating an ultraviolet ray thereon at an illuminance of 400 mW/cm² and an irradiation dose of 300 mJ/cm² with use of an air-cooled metal halide lamp (manufactured by Eye Graphics Co., Ltd.) of 160 W/cm under nitrogen purging to an oxygen concentration of about 0.1%, and the resulting film was taken up. In this way, Optical Film Samples (101) to (111) were produced. The coated amount was adjusted to give the value shown in Table 1 for the film thickness of the antiglare layer.

Incidentally, the film thickness of the antiglare layer was calculated from the average of the measured values by observing the cross-section of the optical film through an electron microscope and measuring the film thickness randomly at 30 portions.

(2) Coating of Surface Regulating Layer

Optical Film Sample (108) was again unrolled, and the coating solution for surface regulating layer was coated thereon by the die coating method using the above-described slot die under the condition of a conveying speed of 30 m/min. After drying at 90° C. for 75 seconds, an ultraviolet ray was irradiated at an illuminance of 400 mW/cm$^2$ and an irradiation dose of 240 mJ/cm$^2$ by using an air-cooled metal halide lamp (manufactured by Eye Graphics Co., Ltd.) of 240 W/cm under nitrogen purging to an oxygen concentration of 0.01 to 0.1% to form a surface regulating layer of 1 μm in thickness, and the resulting film was taken up.

The centerline average roughness (Ra) (μm) was measured in accordance with JIS-B0601 (1982) by using SURF-CORDER MODEL SE-3F manufactured by Kosaka Laboratory Ltd. When the surface regulating layer was provided on the antiglare layer of Optical Film Sample 108, Ra was reduced by 0.05 μm. Incidentally, the Ra measurement conditions were an evaluation length of 2.5 mm, a cutoff value of 0.25 mm, a speed of 0.5 mm/s, a stylus diameter of 2 μm and a weight of 30 μN.

(3) Coating of Low Refractive Index Layer

Each of Optical Film Samples (101) to (107) and (109) to (111) and Optical Film Sample (108) after formation of the surface regulating layer was again unrolled, and the coating solution for low refractive index layer was coated thereon by the die coating method using the above-described slot die under the condition of a conveying speed of 30 m/min. After drying at 90° C. for 75 seconds, an ultraviolet ray was irradiated at an illuminance of 400 mW/cm$^2$ and an irradiation dose of 240 mJ/cm$^2$ by using an air-cooled metal halide lamp (manufactured by Eye Graphics Co., Ltd.) of 240 W/cm under nitrogen purging to an oxygen concentration of 0.01 to 0.1% to form a low refractive index layer of 100 nm in thickness, and the resulting film was taken up. In this way, Optical Film Samples (101) to (111) were produced.

(4) Saponification Treatment of Optical Film

Samples after coating were subjected to the following treatment. An aqueous 1.5 mol/l sodium hydroxide solution was prepared and kept at 55° C. Separately, an aqueous 0.01 mol/l dilute sulfuric acid solution was prepared and kept at 35° C. The optical film sample produced was dipped in the aqueous sodium hydroxide solution for 2 minutes and then dipped in water to thoroughly wash out the aqueous sodium hydroxide solution. Subsequently, the sample was dipped in the aqueous dilute sulfuric acid solution for 1 minute and then dipped in water to thoroughly wash out the aqueous dilute sulfuric acid solution. Finally, the sample was thoroughly dried at 120° C. In this way, saponified Optical Film Samples (101) to (111) were produced.

(5) Production of Polarizing Plate

A 80 μm-thick triacetyl cellulose film (TAC-TD80U, produced by Fujifilm Corp.) which had been dipped in an aqueous 1.5 mol/liter NaOH solution at 55° C. for 2 minutes, neutralized and then washed with water, and each of saponified Optical Film Samples (101) to (111) were adhered for protection to both surfaces of a polarizing film produced by adsorbing iodine to polyvinyl alcohol and stretching the film, whereby a polarizing plate was produced.

(6) Evaluation of Optical Film and Polarizing Plate

These optical film samples obtained were evaluated for the following items. The results are shown in Table 1.

(A) Haze

The entire haze value (H) of the obtained optical film sample was measured in accordance with JIS-K7136.

(B) Denseness of Black

With respect to a liquid crystal display device where a polarizing plate laminated with the optical film sample was disposed on the viewing side surface, sensory evaluation of the denseness of black was performed. The evaluation was performed by the method of arraying a plurality of display units in parallel and relatively comparing these at the same time. The tint of black at the power-off time and the tint of black (black image) at the power-on time each viewed from the frontal side were compared among respective film samples and evaluated according to the following criteria. The criteria are based on the understanding that as the tint of black is stronger, the denseness of the screen is higher.

A: Strong tint of black, and the screen appears very dense.

B: Strong tint of black, and the screen appears dense.

C: Black but gray tinted, and the denseness of the screen is weak.

D: Fairly strong tint of gray, and the screen lacks denseness.

(C) Antiglare Property

The entire surface on the back side of the coated surface of the obtained film was blacked out with a black marker, and the degree of blurring of the reflected image when a bare fluorescent lamp (8,000 cd/m$^2$) without louver was projected from an angle of 5° and the film was observed from the direction of −5° and when projected from an angle of 45° and observed from the direction of −45°, was evaluated according to the following criteria.

A: The contour of the fluorescent lamp was only slightly observed in both cases of −5° and −45°.

B: The contour of the fluorescent lamp was only slightly observed in the case of −5°, but the contour was relatively clearly observed in the case of −45°.

C: The contour of the fluorescent lamp was relatively clearly observed in both cases of −5° and −45°.

D: The contour of the fluorescent lamp was clearly observed in both cases of −5° and −45° or glaring.

(D) Endurance Test

The obtained optical film sample was cut into a size of 35 mm×140 mm and by measuring the haze after leaving the sample to stand under the condition of a temperature of 90° C. for 250 hours, the difference from the haze before standing at 90° C. was calculated. When the absolute value of the change of haze is within 3%, there is no problem in practice.

(E) Evaluation of Surface Profile

The centerline average roughness (Ra) as the surface roughness of the obtained optical film was measured by setting a stylus surface roughness tester "SURFCORDER SE3500" {manufactured by Kosaka Laboratory Ltd.} in accordance with JIS-B0601 (1982), and the value derived by the surface roughness meter was employed.

(F) Image Clarity

The image clarity was measured in accordance with JIS-K7105 by a transmission method using optical combs with a slit width of 2.0 mm, 1.0 mm, 0.5 mm and 0.125 mm of an image clarity meter (Model ICM-2D) manufactured by Suga Test Instruments Co., Ltd., and the values of image clarity measured by four kinds of optical combs were summed up.

TABLE 1

| Sample No. | Coating Solution for Antiglare Layer | Film Thickness of Antiglare Layer (μm) | Film Thickness of Surface Conditioning Layer (μm) | Haze (%) | Denseness of Black | Antiglare Property | Endurance (%) | Display Contrast | Glaring | Ra | Image Clarity (%) | Remarks |
|---|---|---|---|---|---|---|---|---|---|---|---|---|
| 101 | A-1 | 13 | — | 23 | B | B | 1 | 1178 | A | 0.18 | 227 | Invention |
| 102 | A-2 | 10 | — | 20 | A | A | 2 | 1135 | B | 0.13 | 234 | Invention |
| 103 | A-3 | 5 | — | 36 | B | A | −1 | 1050 | B | 0.24 | 186 | Invention |
| 104 | A-4 | 20 | — | 25 | A | A | 1 | 1165 | A | 0.11 | 196 | Invention |
| 105 | A-5 | 13 | — | 27 | C | A | 7 | 997 | B | 0.36 | 121 | Comparison |
| 106 | A-6 | 10 | — | 24 | B | A | 4 | 1106 | D | 0.20 | 315 | Comparison |
| 107 | A-7 | 20 | — | 26 | B | A | 8 | 1001 | B | 0.17 | 146 | Comparison |
| 108 | A-3 | 5 | 1 | 34 | A | B | 0 | 1057 | A | 0.10 | 256 | Invention |
| 109 | A-8 | 11 | — | 22 | A | A | 1 | 1211 | A | 0.10 | 256 | Invention |
| 110 | A-9 | 13 | — | 22 | B | A | 2 | 1216 | A | 0.09 | 209 | Invention |
| 111 | A-10 | 20 | — | 23 | A | A | 1 | 1203 | A | 0.10 | 224 | Invention |

The results shown in Table 1 reveal the followings. In the optical film samples within the scope of the present invention, optical performances (denseness of black, antiglare property) as the antiglare antireflection film are in preferred ranges. Also, the optical film samples within the scope of the present invention are lessened in the change of haze after endurance and assured of excellent endurance. When the light-transmitting particle of Comparative Samples (105) to (107) having bad endurance was observed after the endurance test by an optical microscope at a magnification of 500 times, it was found that a void was produced between the particle and the binder. In Optical Film Samples (104), (109) and (111) within the scope of the present invention, where a hydroxyl group-containing acrylate monomer is used, the optical performances and endurance are particularly excellent.

Example 2

A 80 μm-thick triacetyl cellulose film (TD80U, produced by Fujifilm Corp.) which had been dipped in an aqueous 1.5 mol/liter NaOH solution at 55° C. for 2 minutes, neutralized and then washed with water, and each of (saponified) Optical Film Samples (101) to (111) produced in Example 1 were adhered for protection to both surfaces of a polarizing film produced by adsorbing iodine to polyvinyl alcohol and stretching the film, whereby a polarizing plate was produced. The thus-produced polarizing plate was laminated to replace the polarizing plate on the viewing side of a high vision liquid crystal television set LC-20AX5 manufactured by Sharp Corp. such that the side having a low refractive index layer became the outermost surface. The obtained display device was evaluated for the following items. The results are shown in Table 1.
(E) Display Contrast
The produced antiglare antireflection film was mounted on a liquid crystal television set, and the display contrast (white brightness/black brightness) was measured using a measuring device (EZ-Contrast 160D, manufactured by ELDIM).
(F) Evaluation of Glaring
The produced optical film sample was mounted on a liquid crystal television set, and the degree of glaring (variation of brightness due to the lens effect by protrusions on the optical film surface) was evaluated with an eye according to the following criteria.
A: Glaring is not recognized at all.
B: Glaring is scarcely recognized.
C: Annoying glare is recognized.
The results shown in Table 1 reveal the followings. The optical film of the present invention gives high display contrast and little glaring as an antiglare antireflection film.

Samples (109) to (111) within the scope of the present invention where the shell layer thickness of all light-transmitting particles contained in the antiglare layer is from 12 to 90 nm, are excellent in the optical performances and endurance and in particular, give high display contrast.

Example 3

Each of the film samples of the present invention produced in Example 1 was laminated to the glass plate on the surface of an organic EL display device through a pressure-sensitive adhesive, as a result, the reflection on the glass surface was suppressed and a display device having high visibility was obtained.

Example 4

A polarizing plate having the optical film sample of the present invention on one surface was produced using each of the film samples of the present invention produced in Example 1, a λ/4 plate was laminated to the polarizing plate surface opposite the surface having the optical film sample of the present invention, and the polarizing plate was laminated to the glass plate on the surface of an organic EL display device such that the surface on the side having the optical film sample of the present invention became the outermost surface, as a result, the surface reflection and reflection from the inside of the surface glass were cut and a display device having very high visibility was obtained.

What is claimed is:
1. An antiglare film comprising: a transparent support; and an antiglare layer comprising a light-transmitting particle and a light-transmitting resin, wherein
the light-transmitting particle has a structure comprising a core particle and a shell layer, each of the core particle and the shell layer comprises an organic polymer,
the shell layer has a thickness of from 10 to 2,000 nm,
the core particle has a refractive index of from 1.54 to 1.65, and
the shell layer has a refractive index of from 1.46 to 1.53.
2. The antiglare film as claimed in claim 1, wherein the light-transmitting particle has an average particle diameter expressed on a volume basis of from 6 to 20 μm, and the antiglare layer has a thickness of from 8 to 35 μm.
3. The antiglare film as claimed in claim 1, wherein the light-transmitting particle has an average particle diameter expressed on a volume basis of from 0.5 to 6 μm.

4. The antiglare film as claimed in claim 1, wherein the light-transmitting particle is contained in an amount of 5 parts by mass to less than 45 parts by mass per 100 parts by mass of the light-transmitting resin.

5. The antiglare film as claimed in claim 1, wherein the antiglare layer is formed from a polymer or copolymer of at least one member of the following (A1) and (A2) or a mixed polymer of the polymer and copolymer:
- (A1): an alkyl acrylate comprising an alkyl group having at least either one group of a hydroxyl group and an acryloyl group; and
- (A2): an alkyl methacrylate comprising an alkyl group having at least either one group of a hydroxyl group and an acryloyl group.

6. The antiglare film as claimed in claim 1, wherein the shell layer comprises at least one polymerization product selected from a polymerization product of an acrylic acid ester, a polymerization product of a methacrylic acid ester, and a copolymerization product of an acrylic acid ester and a methacrylic acid ester.

7. The antiglare film as claimed in claim 1, further comprising a surface conditioning layer having a thickness of from 0.5 to 12 μm, so that the transparent support, the antiglare layer and the surface conditioning layer are provided in this order.

8. The antiglare film as claimed in claim 1, wherein the antiglare layer comprises two or more kinds of the light-transmitting particles having the structure comprising a core particle and a shell layer, or comprises a light-transmitting particle having a single refractive index which is different from the light-transmitting particle having the structure comprising a core particle and a shell layer.

9. The antiglare film as claimed in claim 1, wherein a sum of image clarifies measured by four kinds of optical combs defined in JIS K7105 (1999) is 300% or less.

10. An antireflection film comprising: the antiglare film claimed in claim 1;
and a low refractive index layer provided over the antiglare layer of the antiglare film, the low refractive index layer having a refractive index lower than that of the antiglare layer.

11. The antireflection film as claimed in claim 10, wherein the low refractive index layer comprises a hollow silica particle.

12. A polarizing plate comprising: a polarizing film and a protective film provided on both sides of the polarizing film, wherein at least one of the protective films is the antiglare film claimed in claim 1.

13. An image display device comprising the antiglare film claimed in claim 1 which is disposed on an image display surface of the image display device.

* * * * *